US012812696B2

(12) United States Patent
Agiwal

(10) Patent No.: US 12,812,696 B2
(45) Date of Patent: Nov. 24, 2026

(54) PRACH REPETITION FOR UPLINK COVERAGE ENHANCEMENT

(71) Applicant: Samsung Electronics Co., Ltd., Suwon-si (KR)

(72) Inventor: Anil Agiwal, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 292 days.

(21) Appl. No.: 18/615,883

(22) Filed: Mar. 25, 2024

(65) Prior Publication Data

US 2024/0340974 A1 Oct. 10, 2024

Related U.S. Application Data

(60) Provisional application No. 63/463,219, filed on May 1, 2023, provisional application No. 63/457,316, filed on Apr. 5, 2023.

(51) Int. Cl.

| | |
|---|---|
| ***H04W 74/0838*** | (2024.01) |
| ***H04W 72/02*** | (2009.01) |
| ***H04W 72/0457*** | (2023.01) |
| ***H04W 76/20*** | (2018.01) |

(52) U.S. Cl.

CPC ....... *H04W 74/0838* (2024.01); *H04W 72/02* (2013.01); *H04W 72/0457* (2023.01); *H04W 76/20* (2018.02)

(58) Field of Classification Search

CPC ......... H04W 74/0838; H04W 74/0833; H04W 74/004; H04W 74/006; H04W 72/02; H04W 72/0457; H04W 76/20; H04W 56/001; H04L 1/08

See application file for complete search history.

(56) References Cited

U.S. PATENT DOCUMENTS

2022/0287107 A1* 9/2022 Kim ..................... H04B 17/327
2023/0037319 A1* 2/2023 Taherzadeh Boroujeni ................ H04W 74/0841

(Continued)

FOREIGN PATENT DOCUMENTS

| | | | |
|---|---|---|---|
| CN | 115211214 | A | 10/2022 |
| WO | 2022077488 | A1 | 4/2022 |
| WO | 2022082477 | A1 | 4/2022 |

OTHER PUBLICATIONS

International Search Report and Written Opinion issued Jul. 3, 2024 regarding International Application No. PCT/KR2024/004459, 9 pages.

(Continued)

*Primary Examiner* — Farid Seyedvosoghi

(57) ABSTRACT

A user equipment (UE) includes a transceiver configured to receive one or more random access (RA) configurations for a cell, and receive a contention free random access (CFRA) configuration related to a RA procedure. The UE further includes a processor operatively coupled to the transceiver. The processor is configured to select a bandwidth part (BWP) of the cell for performing the RA procedure, select a four step RA as a type for the RA procedure, determine whether the CFRA configuration for the RA procedure includes a parameter indicating a number of message 1 (Msg1) repetitions, and perform the RA procedure in the cell according to a result of the determination.

20 Claims, 16 Drawing Sheets

(56) References Cited

U.S. PATENT DOCUMENTS

| | | | | |
|---|---|---|---|---|
| 2023/0180300 | A1* | 6/2023 | Lin | H04W 48/16<br>370/329 |
| 2023/0262781 | A1 | 8/2023 | Fang et al. | |
| 2023/0422296 | A1* | 12/2023 | Feng | H04W 74/02 |
| 2024/0147328 | A1* | 5/2024 | Kim | H04W 36/30 |
| 2025/0331028 | A1* | 10/2025 | Jiang | H04W 72/23 |

OTHER PUBLICATIONS

"3rd Generation Partnership Project; Technical Specification Group Radio Access Network; NR; Medium Access Control (MAC) protocol specification (Release 17)", 3GPP TS 38.321 V17.4.0, Mar. 2023, 252 pages.

"3rd Generation Partnership Project; Technical Specification Group Radio Access Network; NR; Radio Resource Control (RRC) protocol specification (Release 17)", 3GPP TS 38.331 V17.4.0, Mar. 2023, 1321 pages.

* cited by examiner

PRACH REPETITION FOR UPLINK COVERAGE ENHANCEMENT

CROSS-REFERENCE TO RELATED APPLICATION(S) AND CLAIM OF PRIORITY

This application claims priority under 35 U.S.C. § 119(e) to U.S. Provisional Patent Application No. 63/457,316 filed on Apr. 5, 2023, and U.S. Provisional Patent Application No. 63/463,219 filed on May 1, 2023. The above-identified provisional patent applications are hereby incorporated by reference in their entirety.

TECHNICAL FIELD

This disclosure relates generally to wireless networks. More specifically, this disclosure relates to apparatuses and methods for PRACH repetition for uplink coverage enhancement.

BACKGROUND

The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure provides apparatuses and methods for PRACH repetition for uplink coverage enhancement.

In one embodiment, a user equipment (UE) is provided. The UE includes a transceiver configured to receive one or more random access (RA) configurations for a cell, and receive a contention free random access (CFRA) configuration related to a RA procedure. The UE further includes a processor operatively coupled to the transceiver. The processor is configured to select a bandwidth part (BWP) of the cell for performing the RA procedure, select a four step RA as a type for the RA procedure, determine whether the CFRA configuration for the RA procedure includes a parameter indicating a number of message 1 (Msg1) repetitions, and perform the RA procedure in the cell according to a result of the determination.

In another embodiment, a base station (BS) is provided. The BS includes a transceiver configured to transmit one or RA configurations for a cell, and transmit a CFRA configuration related to a RA procedure. The BS further includes a processor operatively coupled to the transceiver. The processor is configured to perform the RA procedure with a UE in the cell.

In yet another embodiment, a method of operating a UE is provided. The method includes receiving one or more RA configurations for a cell, receiving a CFRA configuration related to a RA procedure, and selecting a bandwidth part (BWP) of the cell for performing the RA procedure. The method further includes selecting a four step RA as a type for the RA procedure, determining whether the CFRA configuration for the RA procedure includes a parameter indicating a number of Msg1 repetitions, and performing the RA procedure in the cell according to a result of the determination.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 15, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mm Wave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

FIGS. 1-3B below describe various embodiments implemented in wireless communications systems and with the use of orthogonal frequency division multiplexing (OFDM) or orthogonal frequency division multiple access (OFDMA) communication techniques. The descriptions of FIGS. 1-3B are not meant to imply physical or architectural limitations to the manner in which different embodiments may be implemented. Different embodiments of the present disclosure may be implemented in any suitably arranged communications system.

Figure 1:
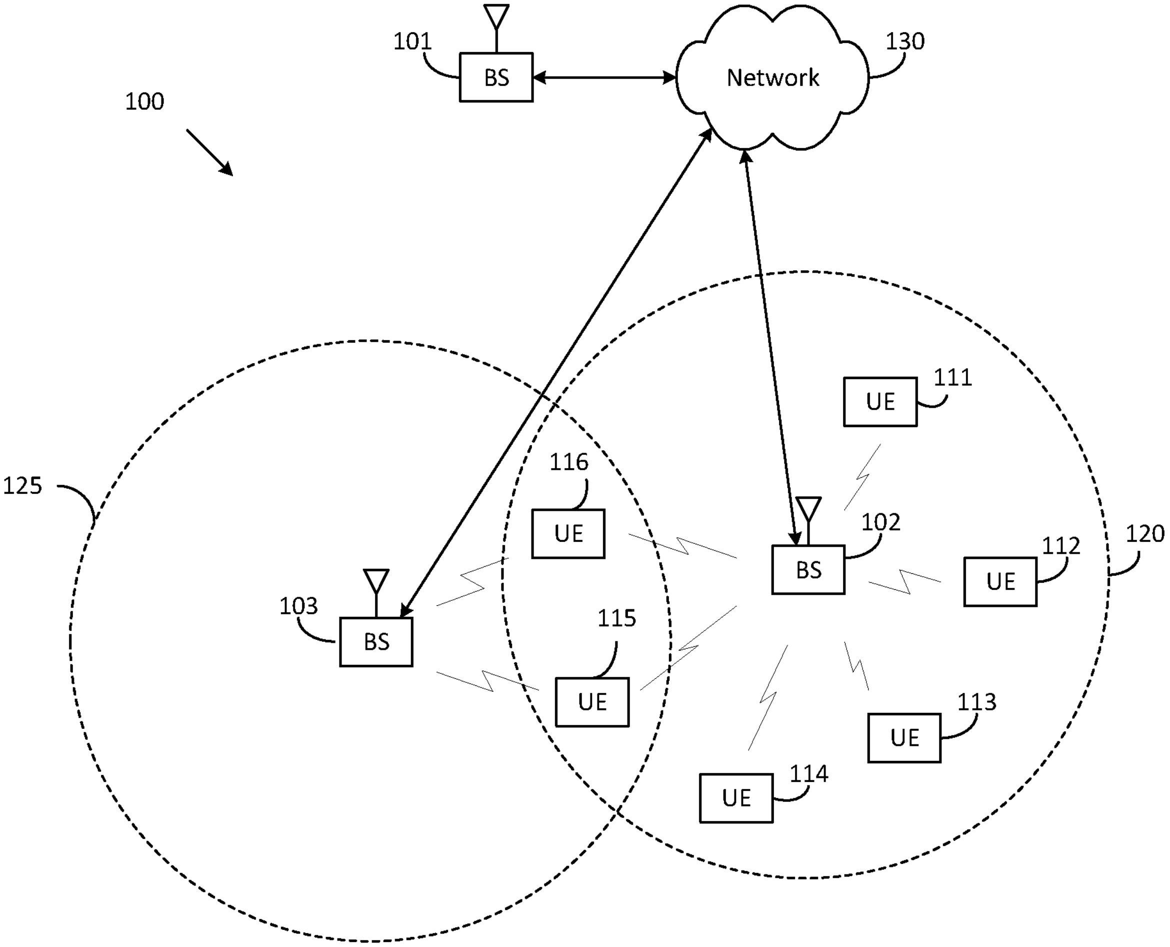
FIG. 1 illustrates an example wireless network according to embodiments of the present disclosure.

FIG. 1 illustrates an example wireless network 100 according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for PRACH repetition for uplink coverage enhancement. In certain embodiments, one or more of the gNBs 101-103 includes circuitry, programing, or a combination thereof, to support PRACH repetition for uplink coverage enhancement in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

Figure 2A:
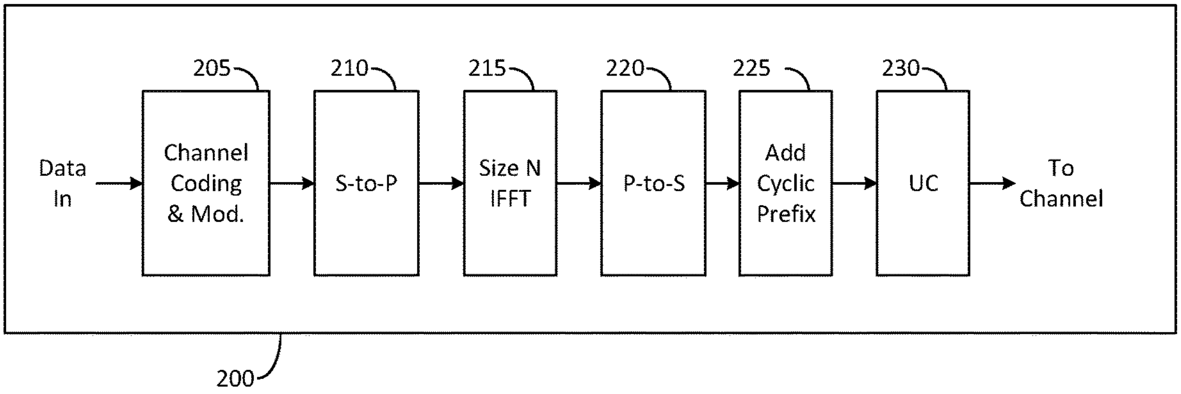
FIGS. 2A and 2B illustrate example wireless transmit and receive paths according to embodiments of the present disclosure.
Figure 2B:
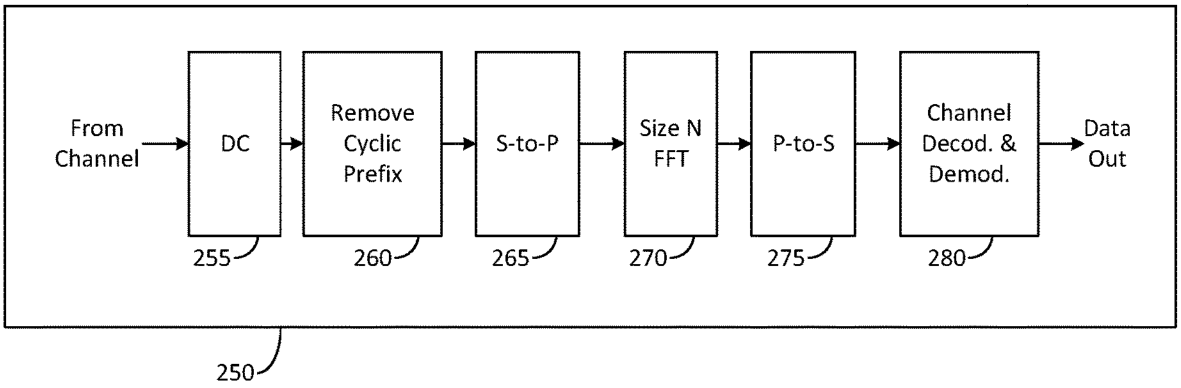

FIGS. 2A and 2B illustrate example wireless transmit and receive paths according to embodiments of the present disclosure. In the following description, a transmit path 200 may be described as being implemented in a gNB (such as gNB 102), while a receive path 250 may be described as being implemented in a UE (such as UE 116). However, it will be understood that the receive path 250 can be implemented in a gNB and that the transmit path 200 can be implemented in a UE.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the gNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the gNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to gNBs 101-103 and may implement a receive path 250 for receiving in the downlink from gNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, can be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B can be combined, further subdivided, or omitted and additional components can be added according to particular needs. Also, FIGS. 2A and 2B are meant to illustrate examples of the types of transmit and receive paths that can be used in a wireless network. Any other suitable architectures can be used to support wireless communications in a wireless network.

Figure 3A:
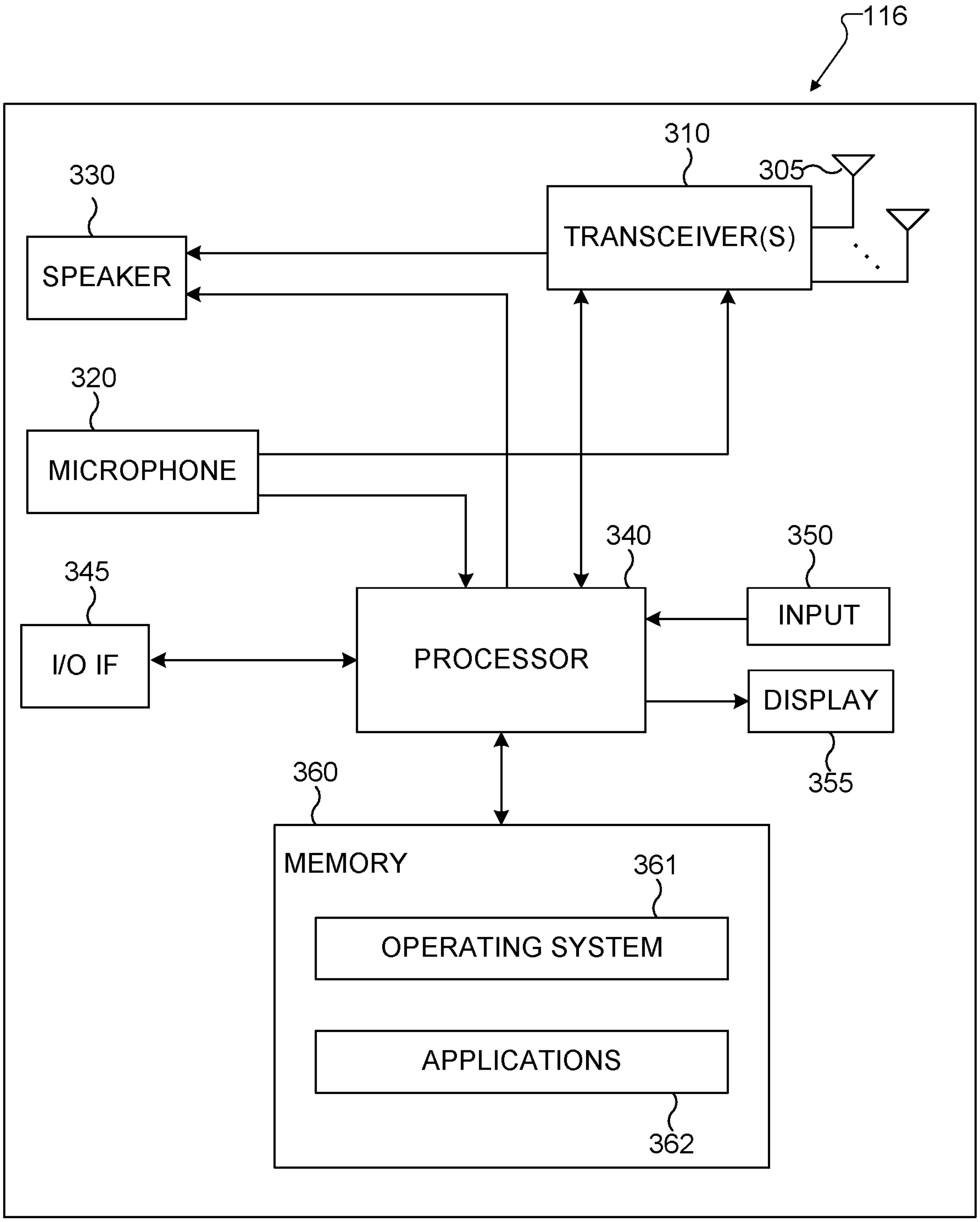
FIG. 3A illustrates an example UE according to embodiments of the present disclosure.

FIG. 3A illustrates an example UE 116 according to embodiments of the present disclosure. The embodiment of the UE 116 illustrated in FIG. 3A is for illustration only, and the UEs 111-115 of FIG. 1 could have the same or similar configuration. However, UEs come in a wide variety of configurations, and FIG. 3A does not limit the scope of this disclosure to any particular implementation of a UE.

As shown in FIG. 3A, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, for example, processes for PRACH repetition for uplink coverage enhancement as discussed in greater detail below. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3A illustrates one example of UE 116, various changes may be made to FIG. 3A. For example, various components in FIG. 3A could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3A illustrates the UE 116 configured as a mobile telephone or smartphone, UEs could be configured to operate as other types of mobile or stationary devices.

Figure 3B:
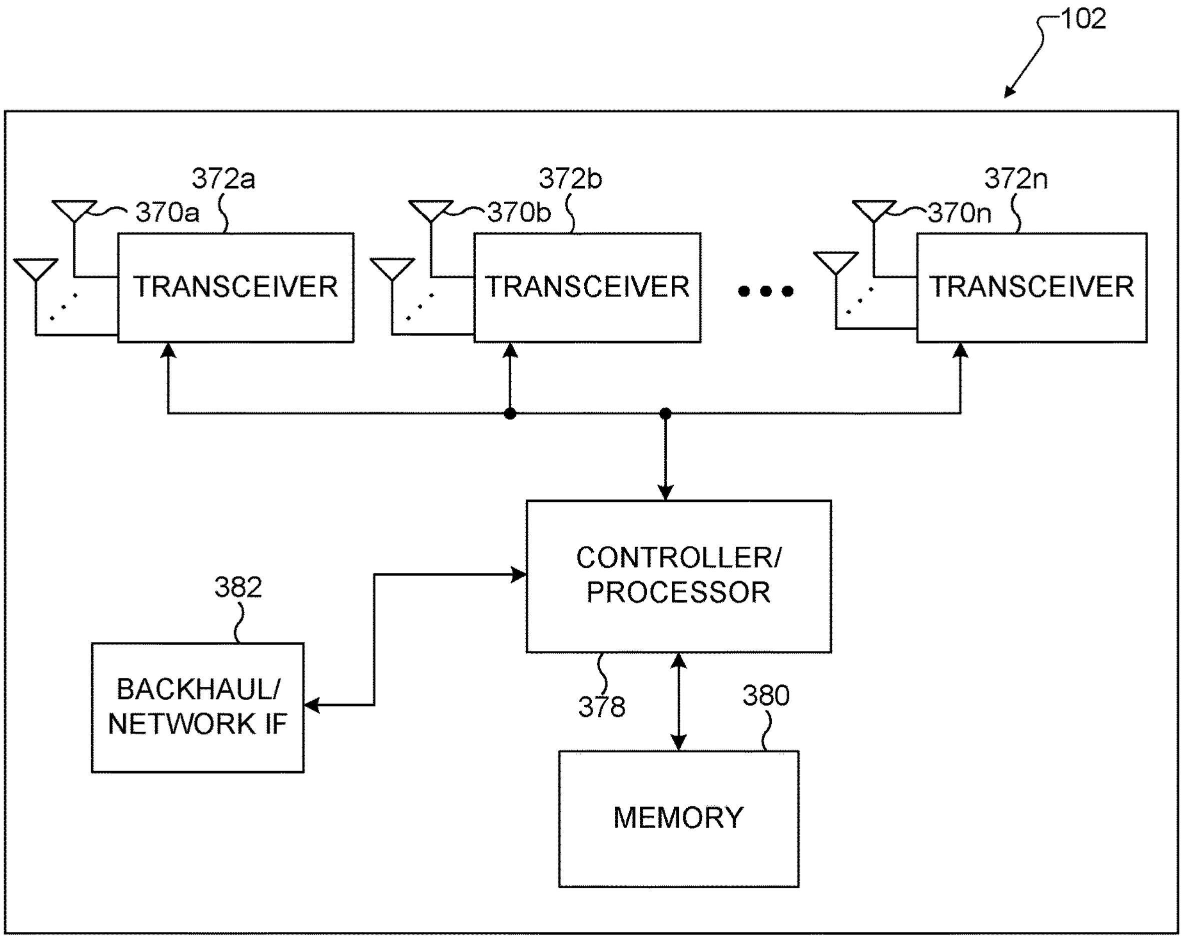
FIG. 3B illustrates an example gNB according to embodiments of the present disclosure.

FIG. 3B illustrates an example gNB 102 according to embodiments of the present disclosure. The embodiment of the gNB 102 illustrated in FIG. 3B is for illustration only, and the gNBs 101 and 103 of FIG. 1 could have the same or similar configuration. However, gNBs come in a wide variety of configurations, and FIG. 3B does not limit the scope of this disclosure to any particular implementation of a gNB.

As shown in FIG. 3B, the gNB 102 includes multiple antennas 370*a*-370*n*, multiple transceivers 372*a*-372*n*, a controller/processor 378, a memory 380, and a backhaul or network interface 382.

The transceivers 372*a*-372*n* receive, from the antennas 370*a*-370*n*, incoming RF signals, such as signals transmitted by UEs in the network 100. The transceivers 372*a*-372*n* down-convert the incoming RF signals to generate IF or baseband signals. The IF or baseband signals are processed by receive (RX) processing circuitry in the transceivers 372*a*-372*n* and/or controller/processor 378, which generates processed baseband signals by filtering, decoding, and/or digitizing the baseband or IF signals. The controller/processor 378 may further process the baseband signals.

Transmit (TX) processing circuitry in the transceivers 372*a*-372*n* and/or controller/processor 378 receives analog or digital data (such as voice data, web data, e-mail, or interactive video game data) from the controller/processor 378. The TX processing circuitry encodes, multiplexes, and/or digitizes the outgoing baseband data to generate processed baseband or IF signals. The transceivers 372*a*-372*n* up-converts the baseband or IF signals to RF signals that are transmitted via the antennas 370*a*-370*n*.

The controller/processor 378 can include one or more processors or other processing devices that control the overall operation of the gNB 102. For example, the controller/processor 378 could control the reception of uplink (UL) channel signals and the transmission of downlink (DL) channel signals by the transceivers 372*a*-372*n* in accordance with well-known principles. The controller/processor 378 could support additional functions as well, such as more advanced wireless communication functions. For instance, the controller/processor 378 could support beam forming or directional routing operations in which outgoing/incoming signals from/to multiple antennas 370*a*-370*n* are weighted differently to effectively steer the outgoing signals in a desired direction. Any of a wide variety of other functions could be supported in the gNB 102 by the controller/processor 378.

The controller/processor 378 is also capable of executing programs and other processes resident in the memory 380, such as an OS and, for example, processes to support PRACH repetition for uplink coverage enhancement as discussed in greater detail below. The controller/processor 378 can move data into or out of the memory 380 as required by an executing process.

The controller/processor 378 is also coupled to the backhaul or network interface 382. The backhaul or network interface 382 allows the gNB 102 to communicate with other devices or systems over a backhaul connection or over a network. The interface 382 could support communications over any suitable wired or wireless connection(s). For example, when the gNB 102 is implemented as part of a cellular communication system (such as one supporting 5G/NR, LTE, or LTE-A), the interface 382 could allow the gNB 102 to communicate with other gNBs over a wired or wireless backhaul connection. When the gNB 102 is implemented as an access point, the interface 382 could allow the gNB 102 to communicate over a wired or wireless local area network or over a wired or wireless connection to a larger network (such as the Internet). The interface 382 includes any suitable structure supporting communications over a wired or wireless connection, such as an Ethernet or transceiver.

The memory 380 is coupled to the controller/processor 378. Part of the memory 380 could include a RAM, and another part of the memory 380 could include a Flash memory or other ROM.

Although FIG. 3B illustrates one example of gNB 102, various changes may be made to FIG. 3B. For example, the gNB 102 could include any number of each component shown in FIG. 3B. Also, various components in FIG. 3B could be combined, further subdivided, or omitted and additional components could be added according to particular needs.

In the fifth-generation wireless communication system (also referred as next generation radio or NR) operating in higher frequency (mmWave) bands, a UE and a gNB communicate with each other using Beamforming. Beamforming techniques are used to mitigate propagation path losses and to increase the propagation distance for communication at higher frequency bands. Beamforming enhances transmission and reception performance using a high-gain antenna. Beamforming can be classified into Transmission (TX) beamforming performed in a transmitting end and reception (RX) beamforming performed in a receiving end. In general, TX beamforming increases directivity by allowing an area in which propagation reaches to be densely located in a specific direction by using a plurality of antennas. In this situation, aggregation of the plurality of antennas can be referred to as an antenna array, and each antenna included in the array can be referred to as an array element. The antenna array can be configured in various forms such as a linear array, a planar array, etc. The use of TX beamforming results in an increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal. By using beamforming techniques, a transmitter can generate a plurality of transmit beam patterns of different directions. Each of these transmit beam patterns can be also referred as a transmit (TX) beam. Wireless communication systems operating at high frequency use a plurality of narrow TX beams to transmit signals in the cell as each narrow TX beam provides coverage to a part of cell. The narrower the TX beam, the higher the antenna gain and hence the larger the propagation distance of a signal transmitted using beamforming. A receiver can also generate a plurality of receive (RX) beam patterns of different directions. Each of these receive patterns can be also referred as receive (RX) beam.

The fifth-generation, wireless communication system, supports standalone modes of operation as well dual connectivity (DC). In DC a multiple Rx/Tx UE may be configured to utilize resources provided by two different nodes (or NBs) connected via non-ideal backhaul. One node acts as the Master Node (MN) and the other as the Secondary Node (SN). The MN and SN are connected via a network interface and at least the MN is connected to the core network. NR also supports Multi-RAT Dual Connectivity (MR-DC) operation whereby a UE in an RRC_CONNECTED state is configured to utilize radio resources provided by two distinct schedulers, located in two different nodes connected via a non-ideal backhaul and providing either E-UTRA (i.e., if the node is an ng-eNB) or NR access (i.e., if the node is a gNB). In NR for a UE in an RRC_CONNECTED state not configured with CA/DC there is only one serving cell comprising the primary cell. For a UE in an RRC_CONNECTED state configured with CA/DC the term 'serving cells' is used to denote the set of cells comprising the Special Cell(s) and all secondary cells. In NR the term Master Cell Group (MCG) refers to a group of serving cells associated with the Master Node, comprising the PCell and optionally one or more SCells. In NR the term Secondary Cell Group (SCG) refers to a group of serving cells associated with the Secondary Node, comprising the PSCell and optionally one or more SCells. In NR the PCell (primary cell) refers to a serving cell in MCG, operating on the primary frequency, in which the UE either performs the initial connection establishment procedure or initiates the connection re-establishment procedure. In NR for a UE configured with CA, an Scell is a cell providing additional radio resources on top of a Special Cell. Primary SCG Cell (PSCell) refers to a serving cell in a SCG in which the UE performs random access when performing the Reconfiguration with Sync procedure. For Dual Connectivity operation the term SpCell (i.e., Special Cell) refers to the PCell of the MCG or the PSCell of the SCG. Otherwise, the term Special Cell refers to the PCell.

In the fifth generation wireless communication system, a node B (gNB) or base station in cell broadcast Synchronization Signal and PBCH block or Synchronization Signal block (SSB) comprises primary and secondary synchronization signals (PSS, SSS) and system information. The system information includes common parameters needed to communicate in cell. In the fifth generation wireless communication system, System Information (SI) is divided into the MIB and a number of SIBs where the MIB is transmitted on the BCH with a periodicity of 80 ms and repetitions made within 80 ms and it includes parameters that are needed to acquire a SIB1 from the cell. The SIB1 is transmitted on the DL-SCH with a periodicity of 160 ms and variable transmission repetition. The default transmission repetition periodicity of a SIB1 is 20 ms but the actual transmission repetition periodicity is up to network implementation. For SSB and CORESET multiplexing pattern 1, SIB1 repetition transmission period is 20 ms. For SSB and CORESET multiplexing pattern 2/3, SIB1 transmission repetition period is the same as the SSB period. SIB1 includes information regarding the availability and scheduling (e.g., mapping of SIBs to SI message, periodicity, SI-window size) of other SIBs with an indication whether one or more SIBs are only provided on-demand, and, in that case, the configuration needed by the UE to perform the SI request. SIB1 is a cell-specific SIB; SIBs other than SIB1 and posSIBs are carried in SystemInformation (SI) messages, which are transmitted on the DL-SCH. Only SIBs or posSIBs having the same periodicity can be mapped to the same SI message. SIBs and posSIBs are mapped to different SI messages. Each SI message is transmitted within periodically occurring time domain windows (referred to as SI-windows with same length for all SI messages). Each SI message is associated with an SI-window and the SI-windows of different SI messages do not overlap. That is, within one SI-window only the corresponding SI message is transmitted. An SI message may be transmitted a number of times within the SI-window. Any SIB or posSIB except SIB1 can be configured to be cell specific or area specific, using an indication in SIB1. The cell specific SIB is applicable only within a cell that provides the SIB while the area specific SIB is applicable within an area referred to as SI area, which comprises one or several cells and is identified by systemInformationAreaID); The mapping of SIBs to SI messages is configured in schedulingInfoList, while the mapping of posSIBs to SI messages is configured in pos-SchedulingInfoList. Each SIB is contained only in a single SI message and each SIB and posSIB is contained at most once in that SI message; For a UE in an RRC_CONNECTED state, the network can provide system information through dedicated signaling using the RRCReconfiguration message, e.g., if the UE has an active BWP with no common search space configured to monitor system information, paging, or upon request from the UE. In the RRC_CONNECTED state, a UE acquires the required SIB(s) only from the PCell. For PSCell and SCells, the network provides the required SI by dedicated signalling, i.e., within an RRCReconfiguration message. Nevertheless, the UE shall acquire the MIB of the PSCell to get SFN timing of the SCG (which may be different from the MCG). Upon change of relevant SI for the SCell, the network releases and adds the concerned SCell. For the PSCell, the required SI can only be changed with Reconfiguration with Sync.

In the fifth generation wireless communication system, a Physical Downlink Control Channel (PDCCH) is used to schedule DL transmissions on a PDSCH and UL transmissions on a PUSCH, where the Downlink Control Information (DCI) on the PDCCH includes: Downlink assignments containing at least modulation and coding format, resource allocation, and hybrid-ARQ information related to DL-SCH; Uplink scheduling grants containing at least modulation and coding format, resource allocation, and hybrid-ARQ information related to UL-SCH. In addition to scheduling, a PDCCH can be used to for: Activation and deactivation of configured PUSCH transmission with configured grant; Activation and deactivation of PDSCH semi-persistent transmission; Notifying one or more UEs of the slot format; Notifying one or more UEs of the PRB(s) and OFDM symbol(s) where the UE may assume no transmission is intended for the UE; Transmission of TPC commands for PUCCH and PUSCH; Transmission of one or more TPC commands for SRS transmissions by one or more UEs; Switching a UE's active bandwidth part; and Initiating a random access procedure. A UE monitors a set of PDCCH candidates in the configured monitoring occasions in one or more configured COntrol REsource SETs (CORESETs) according to the corresponding search space configurations. A CORESET comprises a set of PRBs with a time duration of 1 to 3 OFDM symbols. The resource units Resource Element Groups (REGs) and Control Channel Elements (CCEs) are defined within a CORESET with each CCE comprising a set of REGs. Control channels are formed by aggregation of CCE. Different code rates for the control channels are realized by aggregating different numbers of CCEs. Interleaved and non-interleaved CCE-to-REG mapping are supported in a CORESET. Polar coding is used for PDCCH. Each resource element group carrying PDCCH carries its own DMRS. QPSK modulation is used for PDCCH.

In the fifth-generation wireless communication system, a list of search space configurations is signaled by the GNB for each configured BWP of the serving cell wherein each search configuration is uniquely identified by a search space identifier. The search space identifier is unique amongst the BWPs of a serving cell. An identifier of search space configuration is to be used for a specific purpose such as paging reception, SI reception, random access response reception is explicitly signaled by the gNB for each configured BWP. In NR, the search space configuration comprises the parameters Monitoring-periodicity-PDCCH-slot, Monitoring-offset-PDCCH-slot, Monitoring-symbols-PDCCH-within-slot and duration. A UE determines a PDCCH monitoring occasion(s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration where the slot with number 'x' in a radio frame with number 'y' satisfies the equation below:

$$\big(y*(\text{number of slots in a radio frame})+x-\text{Monitoring-offset-}PDCCH\text{-slot}\big)\bmod\big(\text{Monitoring-periodicity-}PDCCH\text{-slot}\big)=0.$$

The starting symbol of a PDCCH monitoring occasion in each slot having a PDCCH monitoring occasion is given by Monitoring-symbols-PDCCH-within-slot. The length (in symbols) of a PDCCH monitoring occasion is given in the corset associated with the search space. The search space configuration includes the identifier of the coreset configuration associated with it. A list of coreset configurations are signaled by the GNB for each configured BWP of the serving cell wherein each coreset configuration is uniquely identified by a coreset identifier. A coreset identifier is unique amongst the BWPs of a serving cell. Note that each radio frame is of 10 ms duration. A radio frame is identified by a radio frame number or system frame number. Each radio frame comprises several slots wherein the number of slots in a radio frame and duration of slots depends on sub carrier spacing. The number of slots in a radio frame and duration of slots for each supported SCS is pre-defined in NR. Each coreset configuration is associated with a list of TCI (Transmission configuration indicator) states. One DL RS ID (SSB or CSI RS) is configured per TCI state. The list of TCI states corresponding to a coreset configuration is signaled by the gNB via RRC signaling. One of the TCI states in the TCI state list is activated and indicated to the UE by the gNB. A TCI state indicates the DL TX beam (DL TX beam is QCLed with SSB/CSI RS of TCI state) used by the GNB for transmission of a PDCCH in the PDCCH monitoring occasions of a search space.

In the fifth-generation wireless communication system bandwidth adaptation (BA) is supported. With BA, the receive and transmit bandwidth of a UE need not be as large as the bandwidth of the cell and can be adjusted: the width can be ordered to change (e.g., to shrink during period of low activity to save power); the location can move in the frequency domain (e.g., to increase scheduling flexibility); and the subcarrier spacing can be ordered to change (e.g., to allow different services). A subset of the total cell bandwidth of a cell is referred to as a Bandwidth Part (BWP). BA is achieved by configuring a RRC connected UE with BWP(s) and telling the UE which of the configured BWPs is currently the active one. When BA is configured, the UE only has to monitor PDCCH on the one active BWP. That is, it does not have to monitor PDCCH on the entire DL frequency of the serving cell. In the RRC connected state, the UE is configured with one or more DL and UL BWPs, for each configured Serving Cell (i.e., PCell or SCell). For an activated Serving Cell, there is one active UL and DL BWP at any point in time. BWP switching for a Serving Cell is used to activate an inactive BWP and deactivate an active BWP at a time. BWP switching is controlled by the PDCCH indicating a downlink assignment or an uplink grant, by the bwp-InactivityTimer, by RRC signaling, or by the MAC entity itself upon initiation of a Random-Access procedure. Upon addition of SpCell or activation of an SCell, the DL BWP and UL BWP indicated by firstActiveDownlinkBWP-Id and firstActiveUplinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL. Upon expiry of the BWP inactivity timer the UE switches from the active DL BWP to the default DL BWP or initial DL BWP (if default DL BWP is not configured).

In the 5G wireless communication system, random access (RA) is supported. Random access (RA) is used to achieve uplink (UL) time synchronization. RA is used during initial access, handover, radio resource control (RRC) connection re-establishment procedure, scheduling request transmission, secondary cell group (SCG) addition/modification, beam failure recovery and data or control information transmission in UL by a non-synchronized UE in an RRC CONNECTED state. Several types of random access procedures are supported.

One type of random access procedure supported is a Contention based random access (CBRA). This is also referred as 4 step CBRA. In this type of random access, the UE first transmits a Random Access preamble (also referred as Msg1) and then waits for a Random access response (RAR) in the RAR window. A RAR is also referred to as Msg2. A Next generation node B (gNB) transmits the RAR on a physical downlink shared channel (PDSCH). PDCCH scheduling the PDSCH carrying RAR is addressed to a RA-radio network temporary identifier (RA-RNTI). The RA-RNTI identifies the time-frequency resource (also referred to as a physical RA channel (PRACH) occasion or PRACH transmission (TX) occasion or RA channel (RACH) occasion) in which the RA preamble was detected by the gNB. The RA-RNTI is calculated as follows: RA-RNTI=1+s_id+14*t_id+14*80*f_id+14*80*8*ul_carrier_id, where s_id is the index of the first orthogonal frequency division multiplexing (OFDM) symbol of the PRACH occasion where the UE has transmitted Msg1, i.e., RA preamble; $0 \le s\_id < 14$; t_id is the index of the first slot of the PRACH occasion ($0 \le t\_id < 80$); f_id is the index of the PRACH occasion within the slot in the frequency domain ($0 \le f\_id < 8$), and ul_carrier_id is the UL carrier used for Msg1 transmission (0 for normal UL (NUL) carrier and 1 for supplementary UL (SUL) carrier. Several RARs for various Random-access preambles detected by the gNB can be multiplexed in the same RAR media access control (MAC) protocol data unit (PDU) by the gNB. A RAR in a MAC PDU corresponds to the UE's RA preamble transmission if the RAR includes an RA preamble identifier (RAPID) of the RA preamble transmitted by the UE. If the RAR corresponding to its RA preamble transmission is not received during the RAR window and UE has not yet transmitted the RA preamble for a configurable (configured by gNB in RACH configuration) number of times, the UE goes back to the first step, that is select random access resource (preamble/RACH occasion) and transmits the RA preamble. A backoff may be applied before going back to first step.

If the RAR corresponding to its RA preamble transmission is received the UE transmits a message 3 (Msg3) in a UL grant received in the RAR. The Msg3 includes a message such as an RRC connection request, RRC connection re-establishment request, RRC handover confirm, scheduling request, SI request etc. It may include the UE identity (i.e., cell-radio network temporary identifier (C-RNTI) or system architecture evolution (SAE)-temporary mobile subscriber identity (S-TMSI) or a random number). After transmitting the Msg3, the UE starts a contention resolution timer. While the contention resolution timer is running, if the UE receives a physical downlink control channel (PDCCH) addressed to the C-RNTI included in the Msg3, contention resolution is considered successful, the contention resolution timer is stopped, and the RA procedure is completed. While the contention resolution timer is running, if the UE receives a contention resolution MAC control element (CE) including the UE's contention resolution identity (first X bits of common control channel (CCCH) service data unit (SDU) transmitted in Msg3), contention resolution is considered successful, the contention resolution timer is stopped, and the RA procedure is completed. If the contention resolution timer expires and the UE has not yet transmitted the RA preamble for a configurable number of times, the UE goes back to first step i.e., select random access resource (preamble/RACH occasion) and transmits the RA preamble. A backoff may be applied before going back to first step.

Another type of random access procedure supported is a Contention free random access (CFRA). This is also referred as legacy CFRA or 4 step CFRA. The CFRA procedure is used for scenarios such as handover where low latency is required, timing advance establishment for secondary cell (Scell), etc. In CFRA, an Evolved node B (eNB) assigns to the UE a dedicated Random access preamble. The UE transmits the dedicated RA preamble. The ENB transmits the RAR on PDSCH addressed to RA-RNTI. The RAR conveys the RA preamble identifier and timing alignment information. The RAR may also include an UL grant. The RAR is transmitted in a RAR window similar to the contention-based RA (CBRA) procedure. The CFRA is considered successfully completed after receiving the RAR including the RA preamble identifier (RAPID) of the RA preamble transmitted by the UE. In case the RA is initiated for beam failure recovery, CFRA is considered successfully completed if the PDCCH addressed to C-RNTI is received in the search space for beam failure recovery. If the RAR window expires and the RA is not successfully completed and the UE has not yet transmitted the RA preamble for a configurable (configured by gNB in RACH configuration) number of times, the UE retransmits the RA preamble.

For certain events such has handover and beam failure recovery if a dedicated preamble(s) are assigned to UE, during first step of random access i.e., during random access resource selection for Msg1 transmission, the UE determines whether to transmit the dedicated preamble or a non-dedicated preamble. Dedicated preambles are typically provided for a subset of SSBs/CSI RSs. If there is no SSB/CSI RS having DL RSRP above a threshold amongst the SSBs/CSI RSs for which contention free random access resources (i.e., dedicated preambles/ROs) are provided by the gNB, the UE selects a non-dedicated preamble. Otherwise, the UE selects a dedicated preamble. So, during the RA procedure, one random access attempt can be CFRA while other random access attempts can be CBRA.

Yet another type of random access procedure supported is a 2 step contention based random access (2 step CBRA). In the first step of 2 step CBRA, the UE transmits a random access preamble on a PRACH and a payload (i.e., MAC PDU) on a PUSCH. The random access preamble and payload transmission is also referred as MsgA. In the second step, after MsgA transmission, the UE monitors for a response from the network (i.e., gNB) within a configured window. The response is also referred as a MsgB. A next generation node B (gNB) transmits the MsgB on a physical downlink shared channel (PDSCH). PDCCH scheduling the PDSCH carrying MsgB is addressed to a MsgB-radio network temporary identifier (MSGB-RNTI). The MSGB-RNTI identifies the time-frequency resource (also referred as physical RA channel (PRACH) occasion or PRACH transmission (TX) occasion or RA channel (RACH) occasion) in which the RA preamble was detected by the gNB. The MSGB-RNTI is calculated as follows: RA-RNTI=1+s_id+14*t_id+14*80*f_id+14*80*8*ul_carrier_id+14×80×8×2, where s_id is the index of the first orthogonal frequency division multiplexing (OFDM) symbol of the PRACH occasion where UE has transmitted Msg1, i.e., RA preamble; 0≤s_id<14; t_id is the index of the first slot of the PRACH occasion (0≤t_id<80); f_id is the index of the PRACH occasion within the slot in the frequency domain (0≤f_id<8), and ul_carrier_id is the UL carrier used for Msg1 transmission (0 for normal UL (NUL) carrier and 1 for supplementary UL (SUL) carrier.

If a CCCH SDU was transmitted in the MsgA payload, the UE performs contention resolution using the contention resolution information in the MsgB. The contention resolution is successful if the contention resolution identity received in the MsgB matches the first 48 bits of the CCCH SDU transmitted in the MsgA. If a C-RNTI was transmitted in the MsgA payload, the contention resolution is successful if the UE receives a PDCCH addressed to the C-RNTI. If contention resolution is successful, the random access procedure is considered successfully completed. Instead of contention resolution information corresponding to the transmitted MsgA, the MsgB may include fallback information corresponding to the random access preamble transmitted in the MsgA. If the fallback information is received, the UE transmits a Msg3 and performs contention resolution using a Msg4 as in the CBRA procedure. If contention resolution is successful, the random access procedure is considered successfully completed. If contention resolution fails upon fallback (i.e., upon transmitting Msg3), the UE retransmits the MsgA. If the configured window in which the UE monitors network response after transmitting the MsgA expires and UE has not received a MsgB including contention resolution information or fallback information as explained above, the UE retransmits the MsgA. If the random access procedure is not successfully completed even after transmitting the MsgA a configurable number of times, the UE falls back to a 4 step RACH procedure i.e., UE only transmits the PRACH preamble.

The MsgA payload may include one or more of a common control channel (CCCH) service data unit (SDU), dedicated control channel (DCCH) SDU, dedicated traffic channel (DTCH) SDU, buffer status report (BSR) MAC control element (CE), power headroom report (PHR) MAC CE, SSB information, C-RNTI MAC CE, or padding. The MsgA may include a UE ID (e.g., random ID, S-TMSI, C-RNTI, resume ID, etc.) along with a preamble in the first step. The UE ID may be included in the MAC PDU of the MsgA. A UE ID such as C-RNTI may be carried in a MAC CE wherein the MAC CE is included in the MAC PDU. Other UE IDs (such random ID, S-TMSI, C-RNTI, resume ID, etc.) may be carried in a CCCH SDU. The UE ID can be one of a random ID, S-TMSI, C-RNTI, resume ID, IMSI, idle mode ID, inactive mode ID, etc. The UE ID can be different in different scenarios in which the UE performs the RA procedure. When the UE performs RA after power on (before it is attached to the network), then the UE ID is the random ID. When the UE performs RA in an IDLE state after it is attached to network, the UE ID is the S-TMSI. If the UE has an assigned C-RNTI (e.g., in a connected state), the UE ID is the C-RNTI. In case the UE is in INACTIVE state, the UE ID is the resume ID. In addition to the UE ID, some addition control information can be sent in the MsgA. The control information may be included in the MAC PDU of the MsgA. The control information may include one or more of a connection request indication, connection resume request indication, SI request indication, buffer status indication, beam information (e.g., one or more DL TX beam ID(s) or SSB ID(s)), beam failure recovery indication/information, data indicator, cell/BS/TRP switching indication, connection re-establishment indication, reconfiguration complete or handover complete message, etc.

Still another type of random access procedure supported is a 2 step contention free random access (2 step CFRA). In this case the gNB assigns to the UE dedicated Random access preamble(s) and PUSCH resource(s) for MsgA transmission. The RO(s) to be used for preamble transmission may also be indicated. In the first step, the UE transmits the random access preamble on a PRACH and a payload on a PUSCH using the contention free random access resources (i.e., dedicated preamble/PUSCH resource/RO). In the second step, after MsgA transmission, the UE monitors for a response from the network (i.e., gNB) within a configured window. The response is also referred as a MsgB.

The next generation node B (gNB) transmits the MsgB on a physical downlink shared channel (PDSCH). A PDCCH scheduling the PDSCH carrying the MsgB is addressed to a MsgB-radio network temporary identifier (MSGB-RNTI). The MSGB-RNTI identifies the time-frequency resource (also referred as a physical RA channel (PRACH) occasion or PRACH transmission (TX) occasion or RA channel (RACH) occasion) in which the RA preamble was detected by the gNB. The MSGB-RNTI is calculated as follows: RA-RNTI=1+s_id+14*t_id+14*80*f_id+14*80*8*ul_carrier_id+14×80×8×2, where s_id is the index of the first orthogonal frequency division multiplexing (OFDM) symbol of the PRACH occasion where the UE has transmitted the Msg1, i.e., RA preamble; OS s_id<14; t_id is the index of the first slot of the PRACH occasion (0≤t_id<80); f_id is the index of the PRACH occasion within the slot in the frequency domain (0≤f_id<8), and ul_carrier_id is the UL carrier used for Msg1 transmission (0 for normal UL (NUL) carrier and 1 for supplementary UL (SUL) carrier.

If the UE receives the PDCCH addressed to the C-RNTI, the random access procedure is considered successfully completed. If the UE receives fallback information corresponding to its transmitted preamble, the random access procedure is considered successfully completed.

For certain events such has handover and beam failure recovery if dedicated preamble(s) and PUSCH resource(s) are assigned to the UE, during first step of random access i.e., during random access resource selection for MsgA transmission the UE determines whether to transmit a dedicated preamble or non-dedicated preamble. Dedicated preambles are typically provided for a subset of SSBs/CSI RSs. If there are no SSB/CSI RS having a DL RSRP above a threshold amongst the SSBs/CSI RSs for which contention free random access resources (i.e., dedicated preambles/ROs/PUSCH resources) are provided by the gNB, the UE selects a non-dedicated preamble. Otherwise, the UE selects a dedicated preamble. So, during the RA procedure, one random access attempt can be 2 step CFRA while another random access attempt can be 2 step CBRA.

Upon initiation of a random access procedure, the UE first selects the carrier (SUL or NUL). If the carrier to use for the random-access procedure is explicitly signaled by the gNB, the UE selects the signaled carrier for performing the Random-Access procedure. If the carrier to use for the random-access procedure is not explicitly signaled by gNB, and if the Serving Cell for the Random-Access procedure is configured with a supplementary uplink and if the RSRP of the downlink pathloss reference is less than rsrp-ThresholdSSB-SUL, the UE selects the SUL carrier for performing Random Access procedure. Otherwise, the UE selects the NUL carrier for performing Random Access procedure. Upon selecting the UL carrier, the UE determines the UL and DL BWP for the random access procedure as specified in section 5.15 of TS 38.321. The UE then determines whether to perform 2 step or 4 step RACH for this random access procedure.

- If this random access procedure is initiated by a PDCCH order and if the ra-PreambleIndex explicitly provided by the PDCCH is not 0b000000, the UE selects 4 step RACH.
- Otherwise, if 2 step contention free random access resources are signaled by the gNB for this random access procedure, the UE selects 2 step RACH.
- Otherwise, if 4 step contention free random access resources are signaled by the gNB for this random access procedure, the UE selects 4 step RACH.
- Otherwise, if the UL BWP selected for this random access procedure is configured with only 2 step RACH resources, the UE selects 2 step RACH.
- Otherwise, if the UL BWP selected for this random access procedure is configured with only 4 step RACH resources, the UE selects 4 step RACH.
- Otherwise, if the UL BWP selected for this random access procedure is configured with both 2 step and 4 step RACH resources.
- If the RSRP of the downlink pathloss reference is below a configured threshold, the UE selects 4 step RACH. Otherwise, the UE selects 2 step RACH.

The present disclosure considers repetitions of PRACH transmissions within a single random access attempt (or PRACH attempt) for UL coverage enhancements. For multiple PRACH transmissions within one RACH attempt, the PRACH transmissions are only transmitted over ROs associated with the same SSB/CSI-RS. For multiple PRACH transmissions with the same Tx beam in one RACH attempt, transmission power ramping is not applied within one RACH attempt. For multiple PRACH transmissions with the same Tx beam, only one RAR window is supported for RAR monitoring for one RACH attempt. For multiple PRACH transmissions with the same Tx beam, to differentiate the multiple PRACH transmissions from single PRACH transmission, multiple PRACH transmission on separate ROs should be supported. For multiple PRACH transmissions with same Tx beam, to differentiate the multiple PRACH transmissions from single PRACH transmission, multiple PRACH transmissions with separate preambles on shared ROs should be supported. For multiple PRACH transmissions with the same Tx beam, the gNB can configure one or multiple values for the number of multiple PRACH transmissions. If multiple values are configured, PRACH resources differentiation between multiple PRACH transmissions with different number of multiple PRACH transmissions is supported.

In case a cell supports multiple PRACH transmissions within one RACH attempt, upon initiation of random access procedure, how the UE selects a UL carrier, BWP, RA type, RA resource configuration amongst multiple type of random access resources etc. needs to be addressed. Legacy mechanisms may not be sufficient as UL coverage can be different in a cell supporting multiple PRACH transmissions within one RACH attempt.

In consideration of the above, the present disclosure provides:

- Criteria to select SUL based on an RSRP threshold wherein threshold is different depending on whether random access configuration for PRACH repetitions is configured for NUL
- Criteria to select BWP based on whether random access configuration for PRACH repetitions is configured
- Criteria to select random access configuration for PRACH repetitions when UE is configured with multiple random access configurations
- Enhancements to support Msg1 repetitions for PDCCH ordered CFRA and CFRA for reconfiguration with sync, such as msg1 repetition indication/number of repetitions indications in PDCCH order, reconfiguration with sync, and RACH configuration selection based on presence/absence of these indications.

In the existing random access procedure design, upon initiation of random access (RA) procedure, the UE first selects the UL carrier (NUL or SUL). If the cell is configured with SUL and if the RSRP of the downlink pathloss reference is less than rsrp-ThresholdSSB-SUL, the UE selects the SUL carrier for performing the RA procedure. Otherwise (i.e., SUL is not configured or the RSRP of the downlink pathloss reference is >=rsrp-ThresholdSSB-SUL), the UE selects the NUL carrier for performing the RA procedure. Note that the parameter rsrp-ThresholdSSB-SUL is common for all RACH configurations and BWPs of the cell.

UL coverage can be extended using multiple PRACH transmissions within a random access attempt (PRACH attempt). So, a different threshold (smaller than one used for the existing random access procedure) for SUL carrier selection is beneficial for UL carrier selection. In one embodiment, if a gNB signals a random access configuration for PRACH repetitions (i.e., multiple PRACH transmissions within a random access attempt), the gNB can signal a new RSRP threshold (rsrp-ThresholdSSB-SUL-PRACHRepetitons or rsrp-ThresholdSSB-SUL-EnhCov or some other name) for SUL carrier selection in an RRC message or system information. This threshold can be signaled in a random access configuration for PRACH repetitions, or it can be signaled per BWP, or it can be signaled per cell. Note that this new RSRP threshold for SUL carrier selection is different from rsrp-ThresholdSSB-SUL used in the existing random access procedure design. Various methods for UL carrier selection are shown in FIG. 4-9.

Figure 4:
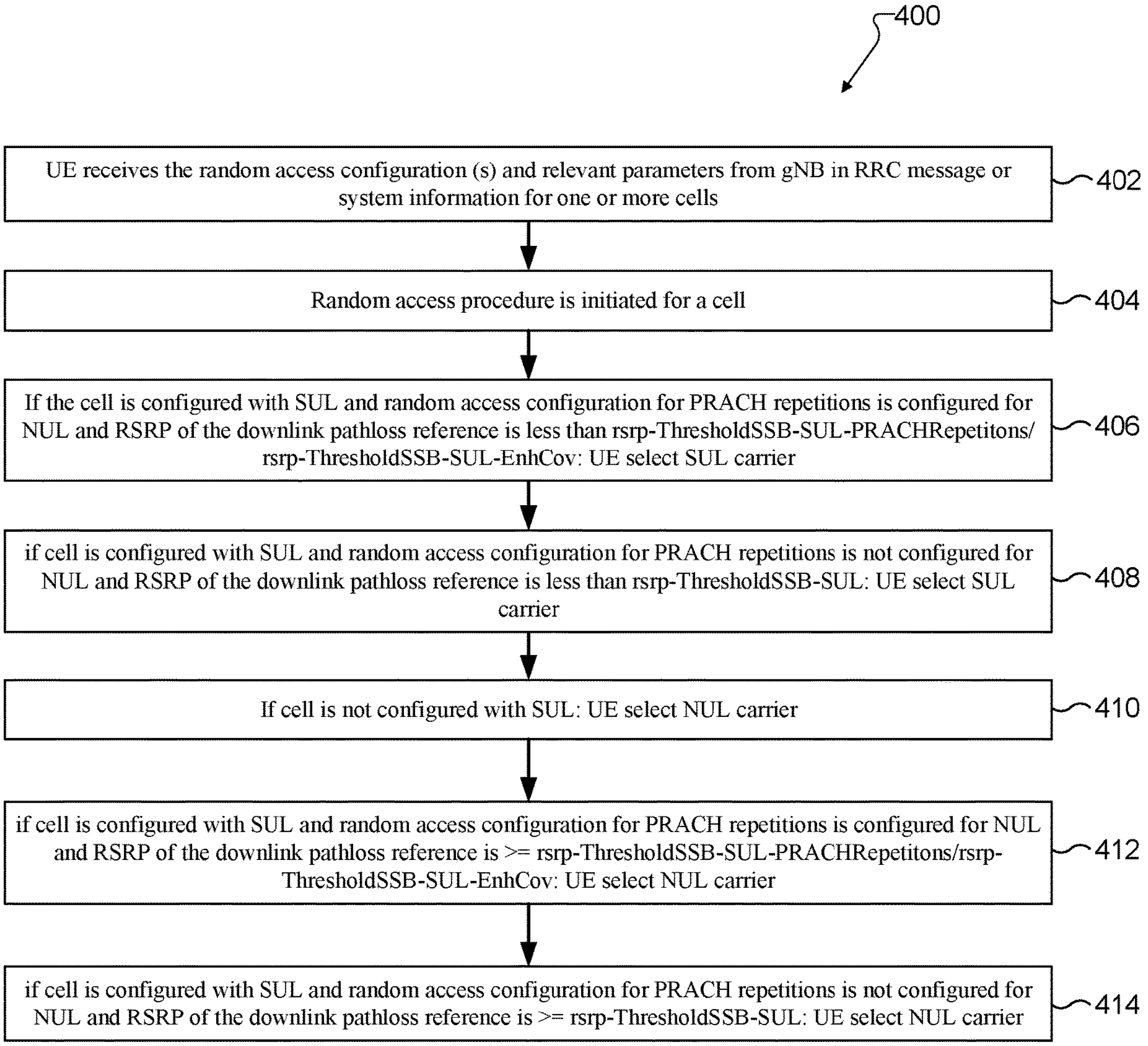
FIG. 4 illustrates a method for UL carrier selection according to embodiments of the present disclosure.

FIG. 4 illustrates a method 400 for UL carrier selection according to embodiments of the present disclosure. An embodiment of the method illustrated in FIG. 4 is for illustration only. One or more of the components illustrated in FIG. 4 may be implemented in specialized circuitry configured to perform the noted functions or one or more of the components may be implemented by one or more processors executing instructions to perform the noted functions. Other embodiments for UL carrier selection could be used without departing from the scope of this disclosure.

The method 400 begins at step 402. At step 402, a UE such as UE 116 of FIG. 1, receives the random access configuration(s) and relevant parameters from a gNB, such as BS 103 of FIG. 1, in a RRC message or system information for one or more cells. At step 404, a random access procedure is initiated for a cell.

At step 406, if the cell is configured with a SUL and random access configuration for PRACH repetitions is configured for the NUL and the RSRP of the downlink pathloss reference is less than rsrp-ThresholdSSB-SUL-PRACH-Repetitons/rsrp-ThresholdSSB-SUL-EnhCov, the UE selects the SUL carrier.

At step 408, if the cell is configured with a SUL and random access configuration for PRACH repetitions is not configured for the NUL and the RSRP of the downlink pathloss reference is less than rsrp-ThresholdSSB-SUL, the UE selects the SUL carrier.

At step 410, if the cell is not configured with a SUL, the UE selects the NUL carrier.

At step 412, if the cell is configured with a SUL and random access configuration for PRACH repetitions is configured for the NUL and the RSRP of the downlink pathloss reference is >=rsrp-ThresholdSSB-SUL-PRACHRepetitons/rsrp-ThresholdSSB-SUL-EnhCov, the UE selects the NUL carrier.

Finally, at step 414, if the cell is configured with a SUL and random access configuration for PRACH repetitions is not configured for the NUL and the RSRP of the downlink pathloss reference is >=rsrp-ThresholdSSB-SUL, the UE selects the NUL carrier.

Although FIG. 4 illustrates one example of a method 400 for UL carrier selection, various changes may be made to FIG. 4. For example, while shown as a series of steps, various steps in FIG. 4 could overlap, occur in parallel, occur in a different order, occur any number of times, be omitted, or replaced by other steps.

Figure 5:
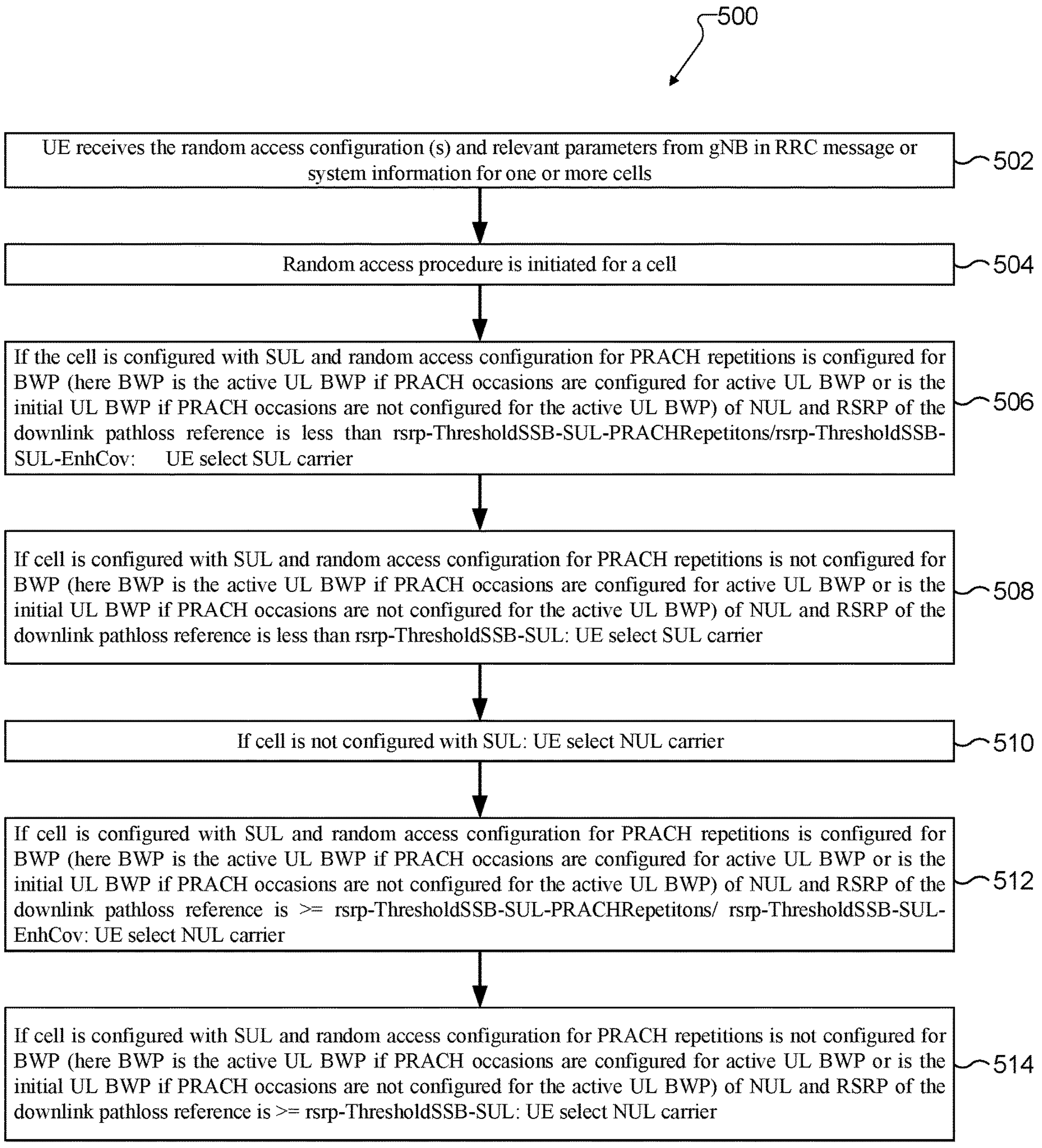
FIG. 5 illustrates a method for UL carrier selection according to embodiments of the present disclosure.

FIG. 5 illustrates a method 500 for UL carrier selection according to embodiments of the present disclosure. An embodiment of the method illustrated in FIG. 5 is for illustration only. One or more of the components illustrated in FIG. 5 may be implemented in specialized circuitry configured to perform the noted functions or one or more of the components may be implemented by one or more processors executing instructions to perform the noted functions. Other embodiments for UL carrier selection could be used without departing from the scope of this disclosure.

The method 500 begins at step 502. At step 502, a UE such as UE 116 of FIG. 1, receives the random access configuration(s) and relevant parameters from a gNB, such as BS 103 of FIG. 1, in a RRC message or system information for one or more cells. At step 504, a random access procedure is initiated for a cell.

At step 506, if the cell is configured with a SUL and random access configuration for PRACH repetitions is configured for the BWP (here the BWP is the active UL BWP if PRACH occasions are configured for active UL BWP or is the initial UL BWP if PRACH occasions are not configured for the active UL BWP) of the NUL and the RSRP of the downlink pathloss reference is less than rsrp-ThresholdSSB-SUL-PRACHRepetitons/rsrp-ThresholdSSB-SUL-EnhCov, the UE selects the SUL carrier.

At step 508, if the cell is configured with a SUL and random access configuration for PRACH repetitions is not configured for the BWP (here the BWP is the active UL BWP if PRACH occasions are configured for active UL BWP or is the initial UL BWP if PRACH occasions are not configured for the active UL BWP) of the NUL and the RSRP of the downlink pathloss reference is less than rsrp-ThresholdSSB-SUL, the UE selects SUL carrier.

At step 510, if the cell is not configured with a SUL, the UE selects NUL carrier.

At step 512, if the cell is configured with a SUL and random access configuration for PRACH repetitions is configured for the BWP (here the BWP is the active UL BWP if PRACH occasions are configured for active UL BWP or is the initial UL BWP if PRACH occasions are not configured for the active UL BWP) of the NUL and the RSRP of the downlink pathloss reference is >=rsrp-ThresholdSSB-SUL-PRACHRepetitons/rsrp-ThresholdSSB-SUL-EnhCov, the UE selects the NUL carrier.

Finally, at step 514, if the cell is configured with a SUL and random access configuration for PRACH repetitions is not configured for the BWP (here the BWP is the active UL BWP if PRACH occasions are configured for active UL BWP or is the initial UL BWP if PRACH occasions are not configured for the active UL BWP) of the NUL and the RSRP of the downlink pathloss reference is >=rsrp-ThresholdSSB-SUL, the UE selects the NUL carrier.

Although FIG. 5 illustrates one example of a method 500 for UL carrier selection, various changes may be made to FIG. 5. For example, while shown as a series of steps, various steps in FIG. 5 could overlap, occur in parallel, occur in a different order, occur any number of times, be omitted, or replaced by other steps.

Figure 6:
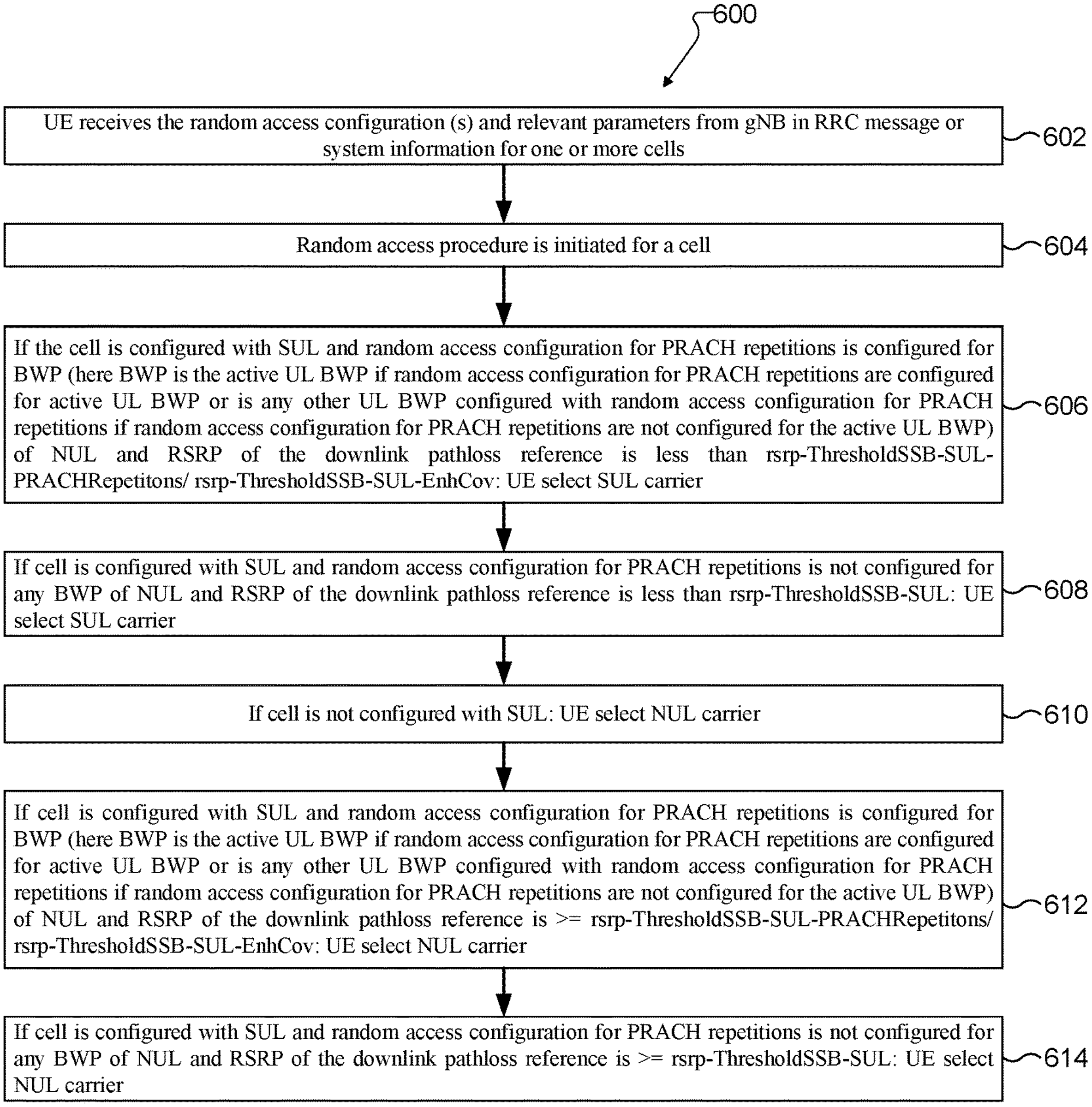
FIG. 6 illustrates a method for UL carrier selection according to embodiments of the present disclosure.

FIG. 6 illustrates a method 600 for UL carrier selection according to embodiments of the present disclosure. An embodiment of the method illustrated in FIG. 6 is for illustration only. One or more of the components illustrated in FIG. 6 may be implemented in specialized circuitry configured to perform the noted functions or one or more of the components may be implemented by one or more processors executing instructions to perform the noted functions. Other embodiments for UL carrier selection could be used without departing from the scope of this disclosure.

The method 600 begins at step 602. At step 602, a UE such as UE 116 of FIG. 1, receives the random access configuration(s) and relevant parameters from a gNB, such as BS 103 of FIG. 1, in a RRC message or system information for one or more cells. At step 604, a random access procedure is initiated for a cell.

At step 606, if the cell is configured with a SUL and random access configuration for PRACH repetitions is configured for the BWP (here the BWP is the active UL BWP if random access configuration for PRACH repetitions are configured for active UL BWP or is any other UL BWP configured with random access configuration for PRACH repetitions if random access configuration for PRACH repetitions are not configured for the active UL BWP) of the NUL and the RSRP of the downlink pathloss reference is less than rsrp-ThresholdSSB-SUL-PRACHRepetitons/rsrp-ThresholdSSB-SUL-EnhCov, the UE selects the SUL carrier.

At step 608, if the cell is configured with a SUL and random access configuration for PRACH repetitions is not configured for any BWP of the NUL and the RSRP of the downlink pathloss reference is less than rsrp-ThresholdSSB-SUL, the UE selects the SUL carrier.

At step 610, if the cell is not configured with a SUL, the UE selects the NUL carrier.

At step 612, if the cell is configured with a SUL and random access configuration for PRACH repetitions is configured for the BWP (here the BWP is the active UL BWP if random access configuration for PRACH repetitions are configured for active UL BWP or is any other UL BWP configured with random access configuration for PRACH repetitions if random access configuration for PRACH repetitions are not configured for the active UL BWP) of the NUL and the RSRP of the downlink pathloss reference is >=rsrp-ThresholdSSB-SUL-PRACHRepetitons/rsrp-ThresholdSSB-SUL-EnhCov, the UE selects the NUL carrier.

Finally, at step 614, If the cell is configured with a SUL and random access configuration for PRACH repetitions is not configured for any BWP of the NUL and the RSRP of the downlink pathloss reference is >=rsrp-ThresholdSSB-SUL, the UE selects the NUL carrier.

Although FIG. 6 illustrates one example of a method 600 for UL carrier selection, various changes may be made to FIG. 6. For example, while shown as a series of steps, various steps in FIG. 6 could overlap, occur in parallel, occur in a different order, occur any number of times, be omitted, or replaced by other steps.

Figure 7:
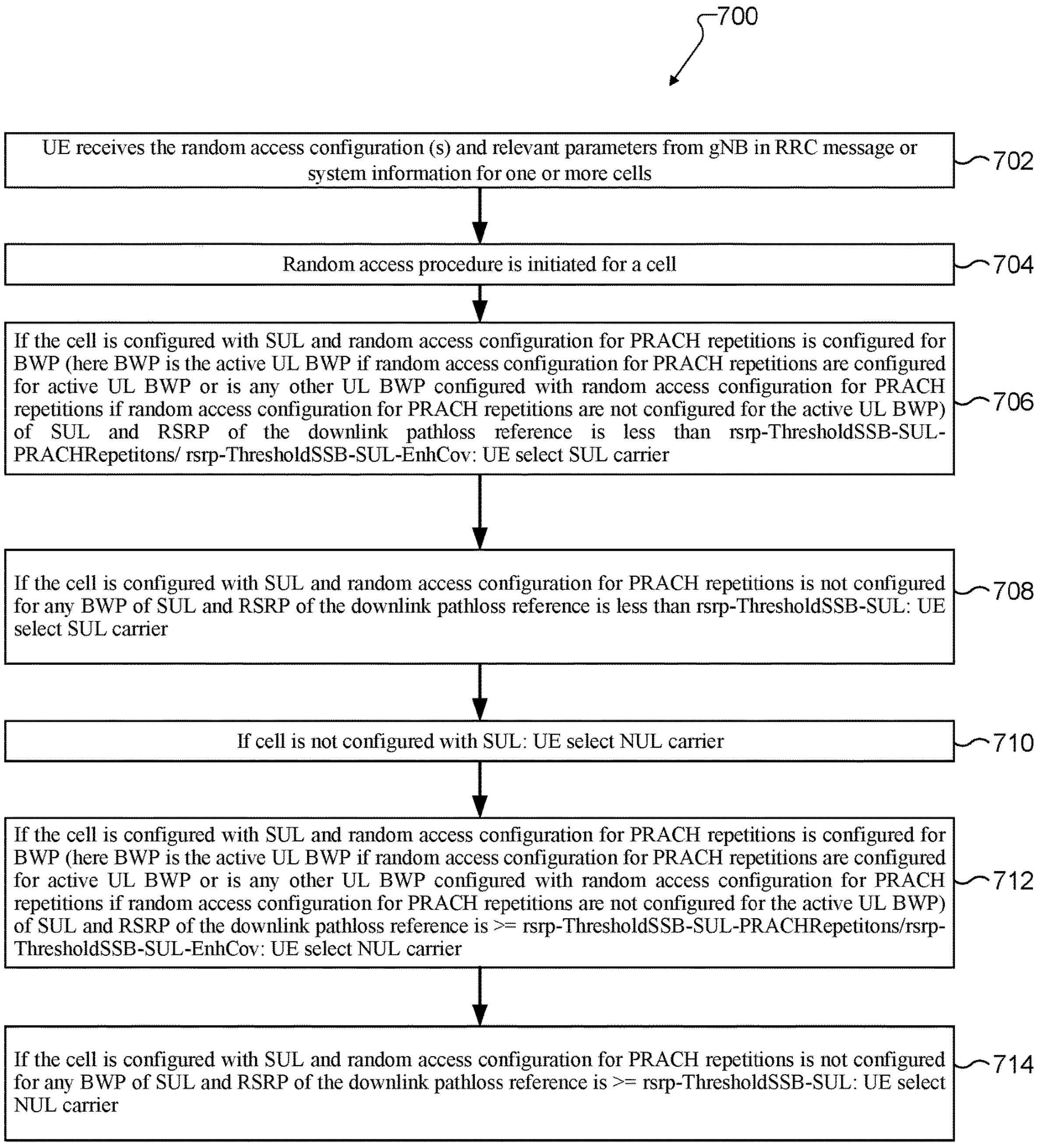
FIG. 7 illustrates a method for UL carrier selection according to embodiments of the present disclosure.

FIG. 7 illustrates a method 700 for UL carrier selection according to embodiments of the present disclosure. An embodiment of the method illustrated in FIG. 7 is for illustration only. One or more of the components illustrated in FIG. 7 may be implemented in specialized circuitry configured to perform the noted functions or one or more of the components may be implemented by one or more processors executing instructions to perform the noted functions. Other embodiments for UL carrier selection could be used without departing from the scope of this disclosure.

The method 700 begins at step 702. At step 702, a UE such as UE 116 of FIG. 1, receives the random access configuration(s) and relevant parameters from a gNB, such as BS 103 of FIG. 1, in a RRC message or system information for one or more cells. At step 704 a random access procedure is initiated for a cell.

At step 706, if the cell is configured with a SUL and random access configuration for PRACH repetitions is configured for the SUL and the RSRP of the downlink pathloss reference is less than rsrp-ThresholdSSB-SUL-PRACH-Repetitons/rsrp-ThresholdSSB-SUL-EnhCov, the UE selects the SUL carrier.

At step 708, if the cell is configured with a SUL and random access configuration for PRACH repetitions is not configured for the SUL and the RSRP of the downlink pathloss reference is less than rsrp-ThresholdSSB-SUL, the UE selects the SUL carrier.

At step 710, if the cell is not configured with a SUL, the UE selects the NUL carrier.

At step 712, if the cell is configured with a SUL and random access configuration for PRACH repetitions is configured for the SUL and the RSRP of the downlink pathloss reference is >=rsrp-ThresholdSSB-SUL-PRACHRepetitons/rsrp-ThresholdSSB-SUL-EnhCov, the UE selects the NUL carrier.

Finally, at step 714, if the cell is configured with a SUL and random access configuration for PRACH repetitions is not configured for the SUL and the RSRP of the downlink pathloss reference is >=rsrp-ThresholdSSB-SUL, the UE selects the NUL carrier.

Although FIG. 7 illustrates one example of a method 700 for UL carrier selection, various changes may be made to FIG. 7. For example, while shown as a series of steps, various steps in FIG. 7 could overlap, occur in parallel, occur in a different order, occur any number of times, be omitted, or replaced by other steps.

Figure 8:
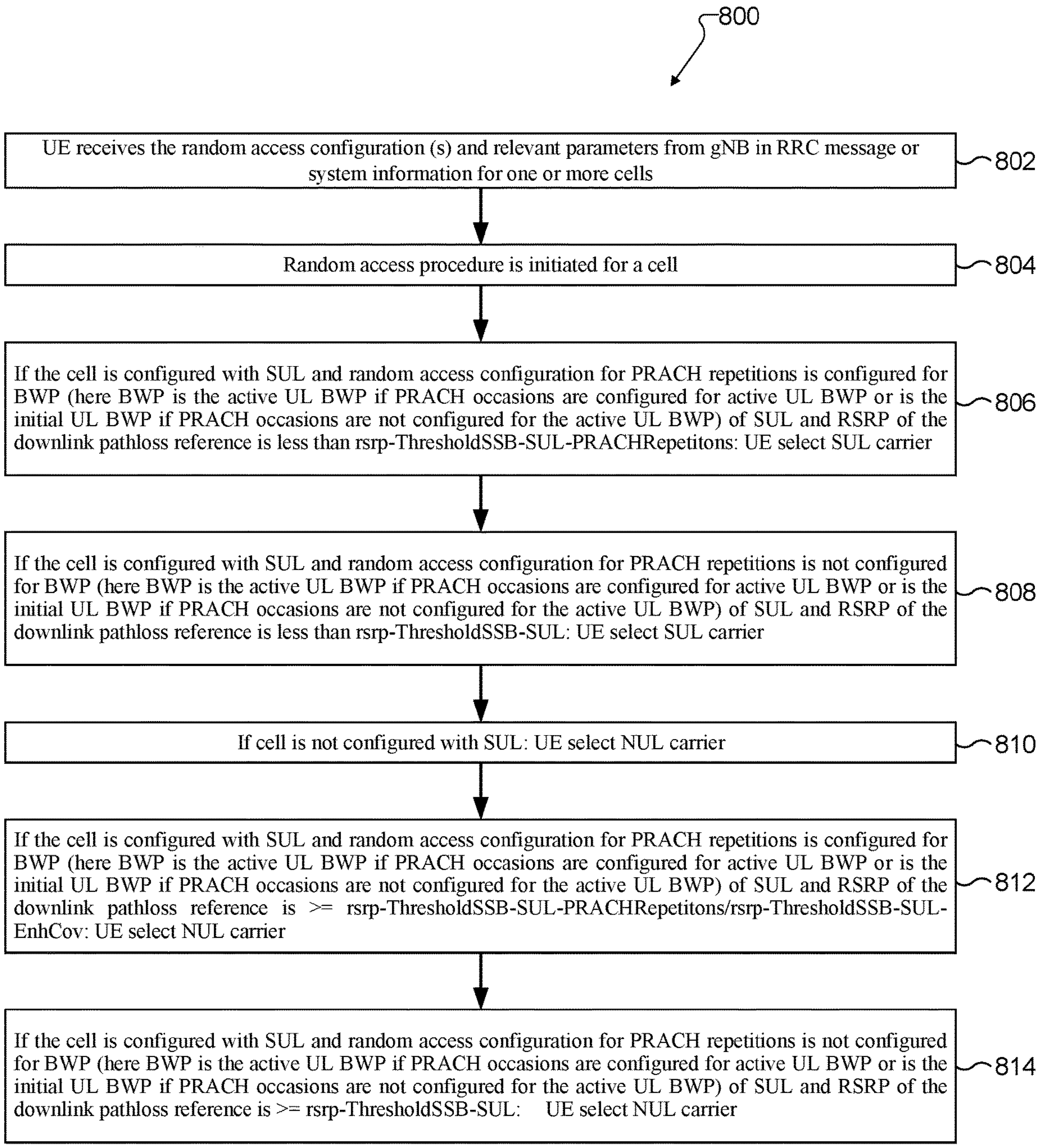
FIG. 8 illustrates a method for UL carrier selection according to embodiments of the present disclosure.

FIG. 8 illustrates a method 800 for UL carrier selection according to embodiments of the present disclosure. An embodiment of the method illustrated in FIG. 8 is for illustration only. One or more of the components illustrated in FIG. 8 may be implemented in specialized circuitry configured to perform the noted functions or one or more of the components may be implemented by one or more processors executing instructions to perform the noted functions. Other embodiments for UL carrier selection could be used without departing from the scope of this disclosure.

The method 800 begins at step 802. At step 802, a UE such as UE 116 of FIG. 1, receives the random access configuration(s) and relevant parameters from a gNB, such as BS 103 of FIG. 1, in a RRC message or system information for one or more cells. At step 802, a random access procedure is initiated for a cell.

At step 806, if the cell is configured with a SUL and random access configuration for PRACH repetitions is configured for the BWP (here the BWP is the active UL BWP if PRACH occasions are configured for active UL BWP or is the initial UL BWP if PRACH occasions are not configured for the active UL BWP) of the SUL and the RSRP of the downlink pathloss reference is less than rsrp-ThresholdSSB-SUL-PRACHRepetitons, the UE selects the SUL carrier.

At step 808, if the cell is configured with a SUL and random access configuration for PRACH repetitions is not configured for the BWP (here the BWP is the active UL BWP if PRACH occasions are configured for active UL BWP or is the initial UL BWP if PRACH occasions are not configured for the active UL BWP) of the SUL and the RSRP of the downlink pathloss reference is less than rsrp-ThresholdSSB-SUL, the UE selects the SUL carrier.

At step 810, if the cell is not configured with SUL, the UE selects the NUL carrier.

At step 812, if the cell is configured with a SUL and random access configuration for PRACH repetitions is configured for the BWP (here the BWP is the active UL BWP if PRACH occasions are configured for active UL BWP or is the initial UL BWP if PRACH occasions are not configured for the active UL BWP) of the SUL and the RSRP of the downlink pathloss reference is >=rsrp-ThresholdSSB-SUL-PRACHRepetitons/rsrp-ThresholdSSB-SUL-EnhCov, the UE selects the NUL carrier.

Finally, at step 814, if the cell is configured with a SUL and random access configuration for PRACH repetitions is not configured for the BWP (here the BWP is the active UL BWP if PRACH occasions are configured for active UL BWP or is the initial UL BWP if PRACH occasions are not configured for the active UL BWP) of the SUL and the RSRP of the downlink pathloss reference is >=rsrp-ThresholdSSB-SUL, the UE selects the NUL carrier.

Although FIG. 8 illustrates one example of a method 800 for UL carrier selection, various changes may be made to FIG. 8. For example, while shown as a series of steps, various steps in FIG. 8 could overlap, occur in parallel, occur in a different order, occur any number of times, be omitted, or replaced by other steps.

Figure 9:
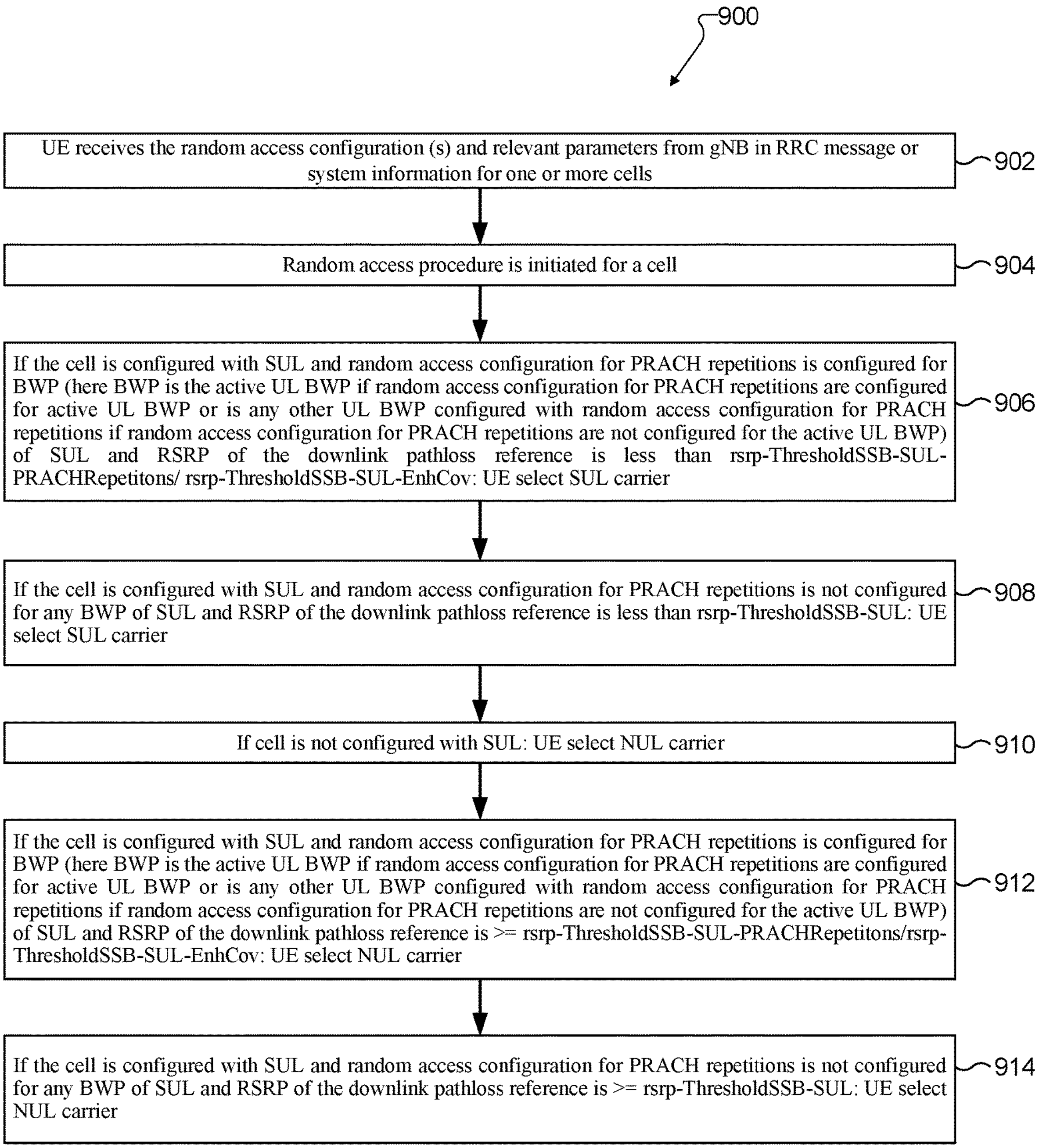
FIG. 9 illustrates a method for UL carrier selection according to embodiments of the present disclosure.

FIG. 9 illustrates a method 900 for UL carrier selection according to embodiments of the present disclosure. An embodiment of the method illustrated in FIG. 9 is for illustration only. One or more of the components illustrated in FIG. 9 may be implemented in specialized circuitry configured to perform the noted functions or one or more of the components may be implemented by one or more processors executing instructions to perform the noted functions. Other embodiments for UL carrier selection could be used without departing from the scope of this disclosure.

The method 900 begins at step 902. At step 902, a UE such as UE 116 of FIG. 1, receives the random access configuration(s) and relevant parameters from the gNB, such as BS 103 of FIG. 1, in a RRC message or system information for one or more cells. At step 904, a random access procedure is initiated for a cell.

At step 906, if the cell is configured with a SUL and random access configuration for PRACH repetitions is configured for the BWP (here the BWP is the active UL BWP if random access configuration for PRACH repetitions are configured for active UL BWP or is any other UL BWP configured with random access configuration for PRACH repetitions if random access configuration for PRACH repetitions are not configured for the active UL BWP) of the SUL and the RSRP of the downlink pathloss reference is less than rsrp-ThresholdSSB-SUL-PRACHRepetitons/rsrp-ThresholdSSB-SUL-EnhCov, the UE selects the SUL carrier.

At step 908, if the cell is configured with a SUL and random access configuration for PRACH repetitions is not configured for any BWP of the SUL and the RSRP of the downlink pathloss reference is less than rsrp-ThresholdSSB-SUL, the UE selects the SUL carrier.

At step 910, if the cell is not configured with a SUL, the UE selects the NUL carrier.

At step 912, if the cell is configured with a SUL and random access configuration for PRACH repetitions is configured for the BWP (here the BWP is the active UL BWP if random access configuration for PRACH repetitions are configured for active UL BWP or is any other UL BWP configured with random access configuration for PRACH repetitions if random access configuration for PRACH repetitions are not configured for the active UL BWP) of the SUL and the RSRP of the downlink pathloss reference is >=rsrp-ThresholdSSB-SUL-PRACHRepetitons/rsrp-ThresholdSSB-SUL-EnhCov, the UE selects the NUL carrier.

Finally, at step 914, if the cell is configured with a SUL and random access configuration for PRACH repetitions is not configured for any BWP of the SUL and the RSRP of the downlink pathloss reference is >=rsrp-ThresholdSSB-SUL, the UE selects the NUL carrier.

Although FIG. 9 illustrates one example of a method 900 for UL carrier selection, various changes may be made to FIG. 9. For example, while shown as a series of steps, various steps in FIG. 9 could overlap, occur in parallel, occur in a different order, occur any number of times, be omitted, or replaced by other steps.

Upon selection of the UL carrier, the UE should select the BWP of the selected UL carrier. In existing random access design, if PRACH occasions are not configured on the active UL BWP of the selected UL carrier, the UE selects the BWP indicated by initialUplinkBWP. The parameter initialUplinkBWP in a BWP configuration indicates the BWP ID of one of the configured BWPs. Configuration of BWPs is signaled in an RRC message.

An active BWP may have PRACH occasions configured. However, the active BWP may not be configured with random access resources for a RACH attempt with multiple PRACH transmissions. In case the UE is not in a good coverage, it may be beneficial to perform a RACH attempt with multiple PRACH transmissions using a BWP other than the current active UL BWP for which random access resources to perform a RACH attempt with multiple PRACH transmissions are configured.

In one embodiment, if a cell supports RACH attempt with multiple PRACH transmissions, the gNB can signal random access resources for the RACH attempt with multiple PRACH transmissions in all BWPs configured with random access resources. With this approach, the UE can select the BWP using the existing procedure. However, this approach lacks flexibility, and the network does not have control on configuring random access resources for the RACH attempt with multiple PRACH transmissions in selective BWP(s) and increases RACH resource overhead. FIG. 7 illustrates a method for BWP selection that mitigates these issues.

Figure 10:
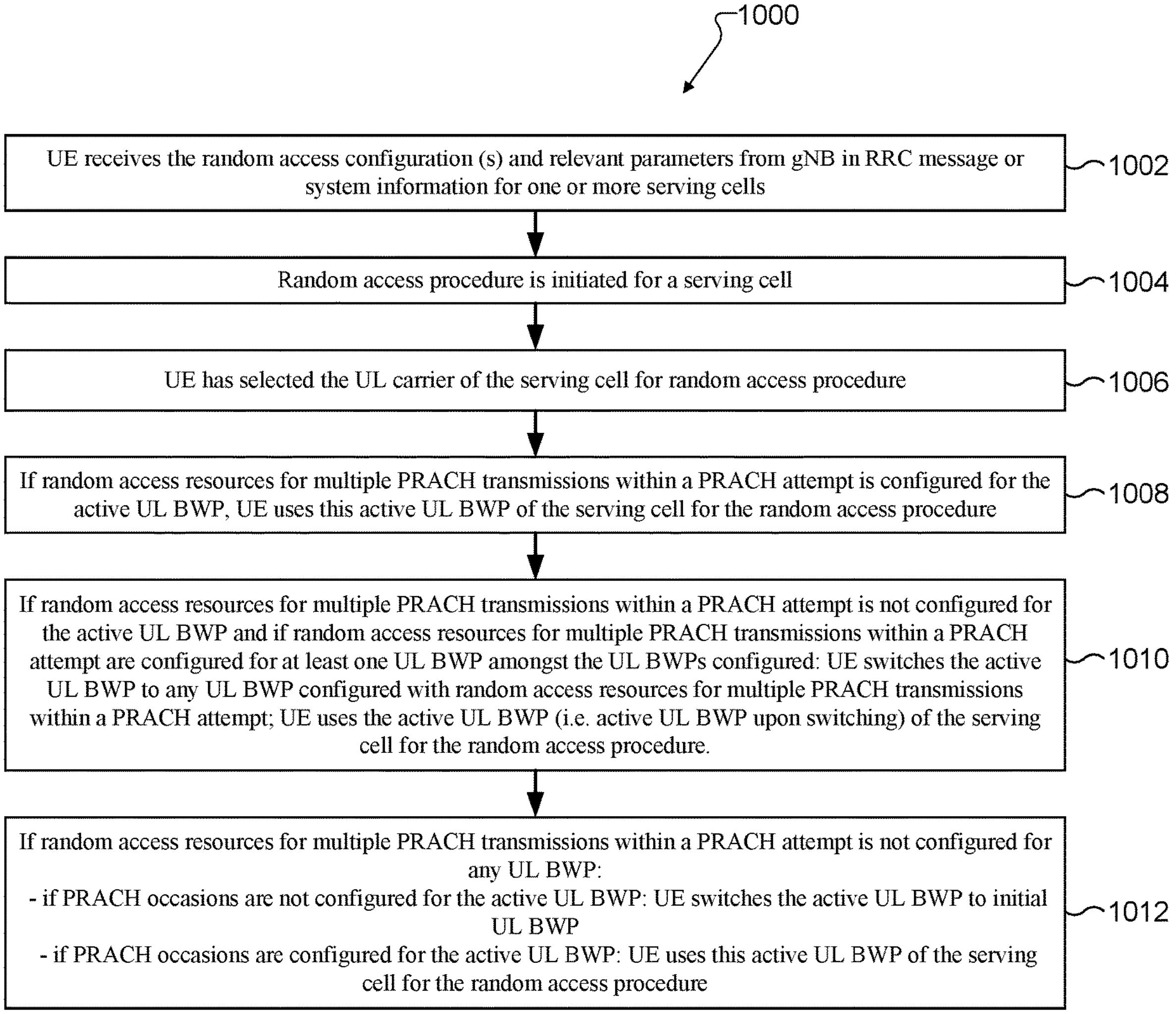
FIG. 10 illustrates a method for BWP selection according to embodiments of the present disclosure.

FIG. 10 illustrates a method 1000 for BWP selection according to embodiments of the present disclosure. An embodiment of the method illustrated in FIG. 10 is for illustration only. One or more of the components illustrated in FIG. 10 may be implemented in specialized circuitry configured to perform the noted functions or one or more of the components may be implemented by one or more processors executing instructions to perform the noted functions. Other embodiments for BWP selection could be used without departing from the scope of this disclosure.

The method 1000 begins at step 1002. At step 1002, a UE such as UE 116 of FIG. 1, receives the random access configuration(s) and relevant parameters from a gNB, such as BS 103 of FIG. 1, in a RRC message or system information for one or more cells. At step 1004, a random access procedure is initiated for a cell. At step 1006, the UE selects the SUL or NUL upon initiation of random access procedure.

At step 1008, if random access resources for multiple PRACH transmissions within a PRACH attempt (or random access resources for PRACH repetitions) is configured for the active UL BWP: a) the UE uses this active UL BWP of the serving cell for the random access procedure; b) if the serving cell is a SpCell and the active DL BWP does not have the same bwp-Id as the active UL BWP, the UE switches the active DL BWP to the DL BWP with the same bwp-Id as the active UL BWP.

In one embodiment, at step 1010, if random access resources for multiple PRACH transmissions within a PRACH attempt (or random access resources for PRACH repetitions) is not configured for the active UL BWP and if random access resources for multiple PRACH transmissions within a PRACH attempt (or random access resources for PRACH repetitions) are configured for at least one UL BWP amongst the UL BWPs configured: a) the UE switches the active UL BWP to any UL BWP configured with random access resources for multiple PRACH transmissions within a PRACH attempt (or random access resources for PRACH repetitions); b) UE uses the active UL BWP (i.e., active UL BWP upon switching) of the serving cell for the random access procedure; c) If the serving cell is a SpCell and the active DL BWP does not have the same bwp-Id as the active UL BWP (i.e., active UL BWP upon switching), the UE switches the active DL BWP to the DL BWP with the same bwp-Id as the active UL BWP (i.e., active UL BWP upon switching).

In an alternative embodiment, at step 1010, if random access resources for multiple PRACH transmissions within a PRACH attempt (or random access resources for PRACH repetitions) is not configured for the active UL BWP and if random access resources for multiple PRACH transmissions within a PRACH attempt (or random access resources for PRACH repetitions) are configured for at least one UL BWP amongst the UL BWPs configured: a) the UE switches the active UL BWP to a UL BWP (indicated by network in RRC) configured with random access resources for multiple PRACH transmissions within a PRACH attempt (or random access resources for PRACH repetitions); b) the UE uses the active UL BWP (i.e., active UL BWP upon switching) of the serving cell for the random access procedure; c) if the serving cell is a SpCell and the active DL BWP does not have the same bwp-Id as the active UL BWP (i.e., active UL BWP upon switching), the UE switches the active DL BWP to the DL BWP with the same bwp-Id as the active UL BWP (i.e., active UL BWP upon switching).

Finally, at step 1012, if random access resources for multiple PRACH transmissions within a PRACH attempt (or random access resources for PRACH repetitions) is not configured for any UL BWP, if PRACH occasions are not configured for the active UL BWP: a) the UE switches the active UL BWP to initial UL BWP (for redcap UE initial UL BWP is initialUplinkBWP-RedCap if configured, otherwise initial UL BWP is initialUplinkBWP); b) If the serving cell is a SpCell, the UE switches the active DL BWP to the initial DL BWP. (for a redcap UE the initial DL BWP is initialDownlinkBWP-RedCap if configured, otherwise the initial DL BWP is initialDownlinkBWP). If random access resources for multiple PRACH transmissions within a PRACH attempt (or random access resources for PRACH repetitions) is not configured for any UL BWP and if PRACH occasions are configured for the active UL BWP and if the serving cell is a SpCell and the active DL BWP does not have the same bwp-Id as the active UL BWP, the UE switches the active DL BWP to the DL BWP with the same bwp-Id as the active UL BWP.

Although FIG. 10 illustrates one example of a method 1000 for BWP selection, various changes may be made to FIG. 10. For example, while shown as a series of steps, various steps in FIG. 10 could overlap, occur in parallel, occur in a different order, occur any number of times, be omitted, or replaced by other steps.

In the UL BWP selected for random access, the UE may be configured with following RA resource configurations:

a) 4 step RA resource configuration for single PRACH transmission in a RACH attempt without Msg3 repetitions b) 4 step RA resource configuration for multiple PRACH transmissions within a RACH attempt (with or without Msg3 repetitions).

In this case, a mechanism is needed to determine which RA resource configuration is used by the UE. Example mechanisms are provided in the present disclosure. In one embodiment, a gNB configures a threshold (rsrp-ThresholdPRACHRepetitons/rsrp-ThresholdMsg3) in RRC signaling. If the RSRP of the downlink pathloss reference is less than rsrp-ThresholdPRACHRepetitons/rsrp-ThresholdMsg3, the UE prioritizes selection of an RA resource configuration for multiple PRACH transmissions within a RACH attempt over an RA resource configuration for single PRACH transmission in a RACH attempt without Msg3 repetitions.

In one embodiment, separate rsrp-ThresholdPRACHRepetitons can be configured for different number of Msg1 repetitions. For example, rsrp-ThresholdPRACHRepetitons for two Msg1 repetitions can be set to threshold 1, rsrp-ThresholdPRACHRepetitons for four Msg1 repetitions can be set to threshold 2, rsrp-ThresholdPRACHRepetitons for eight Msg1 repetitions can be set to threshold 3.

In one embodiment, if a RACH configuration for 2, 4, 8 Msg1 repetitions are configured in the BWP selected for the RA procedure, the UE can select the RACH configuration as follows:

If the RSRP of the downlink pathloss reference >=threshold 1, the UE prioritizes selection of the RA resource configuration without any Msg1 repetitions;

If the RSRP of the downlink pathloss reference <threshold 1 and >=threshold 2, the UE prioritizes selection of the RA resource configuration for multiple PRACH transmissions with two msg1 repetitions;

If the RSRP of the downlink pathloss reference <threshold 2 and >=threshold 3, the UE prioritizes selection of the RA resource configuration for multiple PRACH transmissions with four msg1 repetitions;

If the RSRP of the downlink pathloss reference <threshold 3, the UE prioritizes selection of RA resource configuration for multiple PRACH transmissions with eight msg1 repetitions.

Alternately, the UE can follow the following order to select RACH configuration:

If the RACH configuration for 8 Msg1 repetitions is configured in the BWP selected for the RA procedure and if the RSRP of the downlink pathloss reference <rsrp-ThresholdPRACHRepetitons for eight Msg1 repetitions; or If the BWP selected for random access procedure is configured only with the RA resource configuration for multiple PRACH transmissions within a RACH attempt with 8 Msg1 repetitions, the UE prioritizes selection of the RA resource configuration for multiple PRACH transmissions with 8 msg1 repetitions.

Otherwise, if the RACH configuration for 4 Msg1 repetitions is configured in the BWP selected for the RA procedure and if the RSRP of the downlink pathloss reference <rsrp-ThresholdPRACHRepetitons for 4 Msg1 repetitions; or If the BWP selected for the random access procedure is configured only with the RA resource configuration for multiple PRACH transmissions within a RACH attempt with 4 Msg1 repetitions, the UE prioritizes selection of the RA resource configuration for multiple PRACH transmissions with 4 msg1 repetitions.

Otherwise, if the RACH configuration for 2 Msg1 repetitions is configured in the BWP selected for the RA procedure and if the RSRP of the downlink pathloss reference <rsrp-ThresholdPRACHRepetitons for 2 Msg1 repetitions; or if the BWP selected for the random access procedure is configured only with RA resource configuration for multiple PRACH transmissions within a RACH attempt with 2 Msg1 repetitions, the UE prioritizes selection of RA resource configuration for multiple PRACH transmissions with 2 msg1 repetitions.

Otherwise, the UE prioritizes selection of the RA resource configuration without any Msg1 repetitions.

In the UL BWP selected for random access, the UE may be configured with following RA resource configurations:

a) 4 step RA resource configuration for single PRACH transmission in a RACH attempt without Msg3 repetitions
b) 4 step RA resource configuration for single PRACH transmission in a RACH attempt with Msg3 repetitions
c) 4 step RA resource configuration for multiple PRACH transmissions within a RACH attempt (with or without Msg3 repetitions).

In this case, a mechanism is needed to determine which RA resource configuration is used by the UE. Example mechanisms are provided in the present disclosure. In one embodiment, the gNB configures two thresholds (rsrp-ThresholdPRACHRepetitons and rsrp-ThresholdMsg3) in RRC signaling. If the RSRP of the downlink pathloss reference is less than rsrp-ThresholdPRACHRepetitons, the UE selects the 4 step RA resource configuration for multiple PRACH transmissions within a RACH attempt. Otherwise, if the RSRP of the downlink pathloss reference is less than rsrp-ThresholdMsg3, the UE selects the 4 step RA resource configuration for single PRACH transmission in a RACH attempt with Msg3 repetitions. Otherwise, the UE selects the 4 step RA resource configuration for single PRACH transmission in a RACH attempt without Msg3 repetitions.

In one embodiment, separate rsrp-ThresholdPRACH-Repetitons can be configured for different number of Msg1 repetitions. For example, rsrp-ThresholdPRACHRepetitons for two Msg1 repetitions can be set to threshold 1, rsrp-ThresholdPRACHRepetitons for four Msg1 repetitions can be set to threshold 2, rsrp-ThresholdPRACHRepetitons for eight Msg1 repetitions can be set to threshold 3. The UE can follow the following order to select RACH configuration:

If the RACH configuration for 8 Msg1 repetitions is configured in the BWP selected for the RA procedure and if the RSRP of the downlink pathloss reference <rsrp-ThresholdPRACHRepetitons for 8 Msg1 repetitions; or if the BWP selected for random access procedure is configured only with the RA resource configuration for multiple PRACH transmissions within a RACH attempt with 8 Msg1 repetitions, the UE prioritizes selection of the RA resource configuration for multiple PRACH transmissions with 8 msg1

Otherwise, if the RACH configuration for 4 Msg1 repetitions is configured in the BWP selected for the RA procedure and if the RSRP of the downlink pathloss reference <rsrp-ThresholdPRACHRepetitons for 4 Msg1 repetitions; or if the BWP selected for the random access procedure is configured only with the RA resource configuration for multiple PRACH transmissions within a RACH attempt with 4 Msg1 repetitions, the UE prioritizes selection of the RA resource configuration for multiple PRACH transmissions with 4 msg1 repetitions.

Otherwise, if the RACH configuration for 2 Msg1 repetitions is configured in the BWP selected for the RA procedure and if the RSRP of the downlink pathloss reference <rsrp-ThresholdPRACHRepetitons for 2 Msg1 repetitions; or if the BWP selected for the random access procedure is configured only with the RA resource configuration for multiple PRACH transmissions within a RACH attempt with 2 Msg1 repetitions, the UE prioritizes selection of RA resource configuration for multiple PRACH transmissions with 2 msg1 repetitions.

Otherwise, if the RACH configuration for the Msg3 repetitions is configured in the BWP selected for the RA procedure and if the RSRP of the downlink pathloss reference <rsrp-ThresholdMsg3; or if the BWP selected for the random access procedure is configured only with the RA resource configuration for Msg3 repetitions, the UE prioritizes selection of the RA resource configuration for msg3 repetitions.

Otherwise, the UE prioritizes selection of the RA resource configuration without any Msg1 repetitions.

In one embodiment, a gNB configures two thresholds (rsrp-ThresholdPRACHRepetitons and/or rsrp-Threshold-Msg3) in RRC signaling.

In one embodiment, if the BWP selected for the random access procedure is configured with the 4 step RA resource configuration for multiple PRACH transmissions within a RACH attempt and if the RSRP of the downlink pathloss reference is less than rsrp-ThresholdPRACHRepetitons; or if the BWP selected for random access procedure is configured only with 4 step RA resource configuration for multiple PRACH transmissions within a RACH attempt, the UE selects the 4 step RA resource configuration for multiple PRACH transmissions within a RACH attempt.

In one embodiment, if the BWP selected for random access procedure is configured with the 4 step RA resource configuration for single PRACH transmission in a RACH attempt with Msg3 repetitions and if the RSRP of the downlink pathloss reference is less than rsrp-Threshold-Msg3; or if the BWP selected for random access procedure is configured only with the 4 step RA resource configuration for single PRACH transmission in a RACH attempt with Msg3 repetitions, the UE selects the 4 step RA resource configuration for single PRACH transmission in a RACH attempt with Msg3 repetitions.

In one embodiment, separate rsrp-ThresholdPRACH-Repetitons can be configured for a different number of Msg1 repetitions. For example, rsrp-ThresholdPRACHRepetitons for two Msg1 repetitions can be set to threshold 1, rsrp-ThresholdPRACHRepetitons for four Msg1 repetitions can be set to threshold 2, rsrp-ThresholdPRACHRepetitons for eight Msg1 repetitions can be set to threshold 3. The UE can follow the following order to select RACH configuration:

If the BWP selected for random access procedure is configured only with the 4 step RA resource configuration for multiple PRACH transmissions within a RACH attempt with 8 Msg1 repetitions, the UE selects the 4 step RA resource configuration for multiple PRACH transmissions within a RACH attempt with 8 Msg1 repetitions.

If the BWP selected for random access procedure is configured only with the 4 step RA resource configuration for multiple PRACH transmissions within a RACH attempt with 4 Msg1 repetitions, the UE selects the 4 step RA resource configuration for multiple PRACH transmissions within a RACH attempt with 4 Msg1 repetitions.

Figure 11:
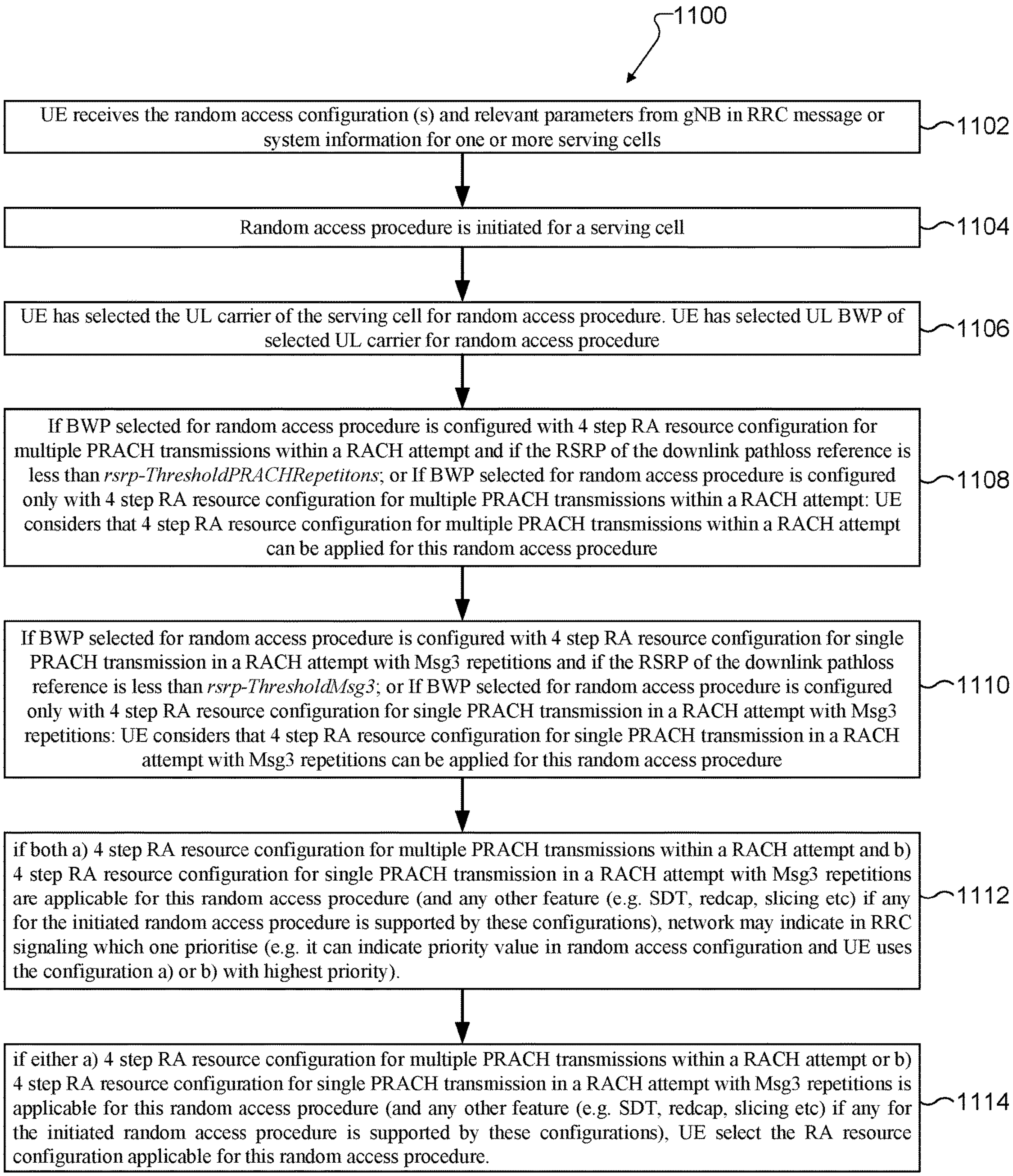
FIG. 11 illustrates a method for RA resource configuration selection according to embodiments of the present disclosure.

If the BWP selected for random access procedure is configured only with the 4 step RA resource configuration for multiple PRACH transmissions within a RACH attempt with 2 Msg1 repetitions, the UE selects the 4 step RA resource configuration for multiple PRACH transmissions within a RACH attempt with 2 Msg1 repetitions In one embodiment, as shown in FIG. 11, a gNB configures two thresholds (rsrp-ThresholdPRACHRepetitons and/or rsrp-ThresholdMsg3) in RRC signaling.

FIG. 11 illustrates a method 1100 for RA resource configuration selection according to embodiments of the present disclosure. An embodiment of the method illustrated in FIG. 11 is for illustration only. One or more of the components illustrated in FIG. 11 may be implemented in specialized circuitry configured to perform the noted functions or one or more of the components may be implemented by one or more processors executing instructions to perform the noted functions. Other embodiments for RA resource configuration selection could be used without departing from the scope of this disclosure.

The method 1100 begins at step 1102. At step 1102, a UE such as UE 116 of FIG. 1, receives the random access configuration(s) and relevant parameters from a gNB, such as BS 103 of FIG. 1, in a RRC message or system information for one or more cells. At step 1104, a random access procedure is initiated for a cell. At step 1106, the UE selects the SUL or NUL upon initiation of random access procedure, and the UE selects the BWP for the selected carrier for this random access procedure.

At step 1108, if the BWP selected for the random access procedure is configured with the 4 step RA resource configuration for multiple PRACH transmissions within a RACH attempt and if the RSRP of the downlink pathloss reference is less than rsrp-ThresholdPRACHRepetitons; or if the BWP selected for the random access procedure is configured only with the 4 step RA resource configuration for multiple PRACH transmissions within a RACH attempt, the UE considers that the 4 step RA resource configuration for multiple PRACH transmissions within a RACH attempt can be applied for this random access procedure.

At step 1110, if the BWP selected for the random access procedure is configured with the 4 step RA resource configuration for single PRACH transmission in a RACH attempt with Msg3 repetitions and if the RSRP of the downlink pathloss reference is less than rsrp-ThresholdMsg3; or if the BWP selected for the random access procedure is configured only with the 4 step RA resource configuration for single PRACH transmission in a RACH attempt with Msg3 repetitions, the UE considers that 4 step RA resource configuration for single PRACH transmission in a RACH attempt with Msg3 repetitions can be applied for this random access procedure.

At step 1112, based on the previous steps, if both a) 4 step RA resource configuration for multiple PRACH transmissions within a RACH attempt and b) 4 step RA resource configuration for single PRACH transmission in a RACH attempt with Msg3 repetitions are applicable for this random access procedure (and any other feature (e.g., SDT, redcap, slicing etc) if any for the initiated random access procedure is supported by these configurations), the network may indicate in RRC signalling which one prioritise (e.g., the network can indicate a priority value in the random access configuration and the UE uses the configuration a) or b) with the highest priority).

At step 1114, based on the previous steps, if either a) 4 step RA resource configuration for multiple PRACH transmissions within a RACH attempt or b) 4 step RA resource configuration for single PRACH transmission in a RACH attempt with Msg3 repetitions is applicable for this random access procedure (and any other feature (e.g., SDT, redcap, slicing etc) if any for the initiated random access procedure is supported by these configurations), the UE selects the RA resource configuration applicable for this random access procedure.

Although FIG. 11 illustrates one example of a method 1100 for RA resource configuration selection, various changes may be made to FIG. 11. For example, while shown as a series of steps, various steps in FIG. 11 could overlap, occur in parallel, occur in a different order, occur any number of times, be omitted, or replaced by other steps.

In one embodiment, separate rsrp-ThresholdPRACHRepetitons can be configured for different numbers of Msg1 repetitions. For example, rsrp-ThresholdPRACHRepetitons for two Msg1 repetitions can be set to threshold 1, rsrp-ThresholdPRACHRepetitons for four Msg1 repetitions can be set to threshold 2, rsrp-ThresholdPRACHRepetitons for eight Msg1 repetitions can be set to threshold 3. The UE can follow the following order to select RACH configuration:

If the BWP selected for the random access procedure is configured with the 4 step RA resource configuration for multiple PRACH transmissions within a RACH attempt with 8 Msg1 repetitions and if the RSRP of the downlink pathloss reference is less than rsrp-ThresholdPRACHRepetitons for 8 Msg1 repetitions; or if the BWP selected for the random access procedure is configured only with the 4 step RA resource configuration for multiple PRACH transmissions within a RACH attempt with 8 Msg1 repetitions, the UE considers that 4 step RA resource configuration for multiple PRACH transmissions within a RACH attempt with 8 msg1 repetitions can be applied for this random access procedure.

If the BWP selected for the random access procedure is configured with the 4 step RA resource configuration for multiple PRACH transmissions within a RACH attempt with 4 Msg1 repetitions and if the RSRP of the downlink pathloss reference is less than rsrp-ThresholdPRACHRepetitons for 4 Msg1 repetitions; or if the BWP selected for random access procedure is configured only with the 4 step RA resource configuration for multiple PRACH transmissions within a RACH attempt with 4 Msg1 repetitions, the UE considers that 4 step RA resource configuration for multiple PRACH transmissions within a RACH attempt with 4 msg1 repetitions can be applied for this random access procedure.

If the BWP selected for the random access procedure is configured with the 4 step RA resource configuration for multiple PRACH transmissions within a RACH attempt with 2 Msg1 repetitions and if the RSRP of the downlink pathloss reference is less than rsrp-ThresholdPRACHRepetitons for 2 Msg1 repetitions; or if the BWP selected for random access procedure is configured only with the 4 step RA resource configuration for multiple PRACH transmissions within a RACH attempt with 2 Msg1 repetitions, the UE considers that the 4 step RA resource configuration for multiple PRACH transmissions within a RACH attempt with 2 msg1 repetitions can be applied for this random access procedure.

In one embodiment, the network may not be allowed to configure a separate 4 step RA resource configuration for single PRACH transmission in a RACH attempt with Msg3 repetitions if a 4 step RA resource configuration for multiple PRACH transmissions within a RACH attempt is configured. In this case only one of rsrp-ThresholdPRACHRepetitons or rsrp-ThresholdMsg3 may be configured, and the UE uses the same for selection. The network is still allowed to configure a single 4 step RA resource configuration for multiple PRACH transmissions within a RACH attempt and Msg3 repetitions.

In one embodiment the criteria to select the 4 step RA resource configuration for multiple PRACH transmissions within a RACH attempt can be applied at the initiation of the random access procedure only. In one embodiment the criteria to select the 4 step RA resource configuration for multiple PRACH transmissions within a RACH attempt can be applied at the beginning of each random access attempt during the random access procedure. This can be helpful in adjusting transmissions in each attempt based on the channel condition at the time of the random access attempt.

Figure 12:
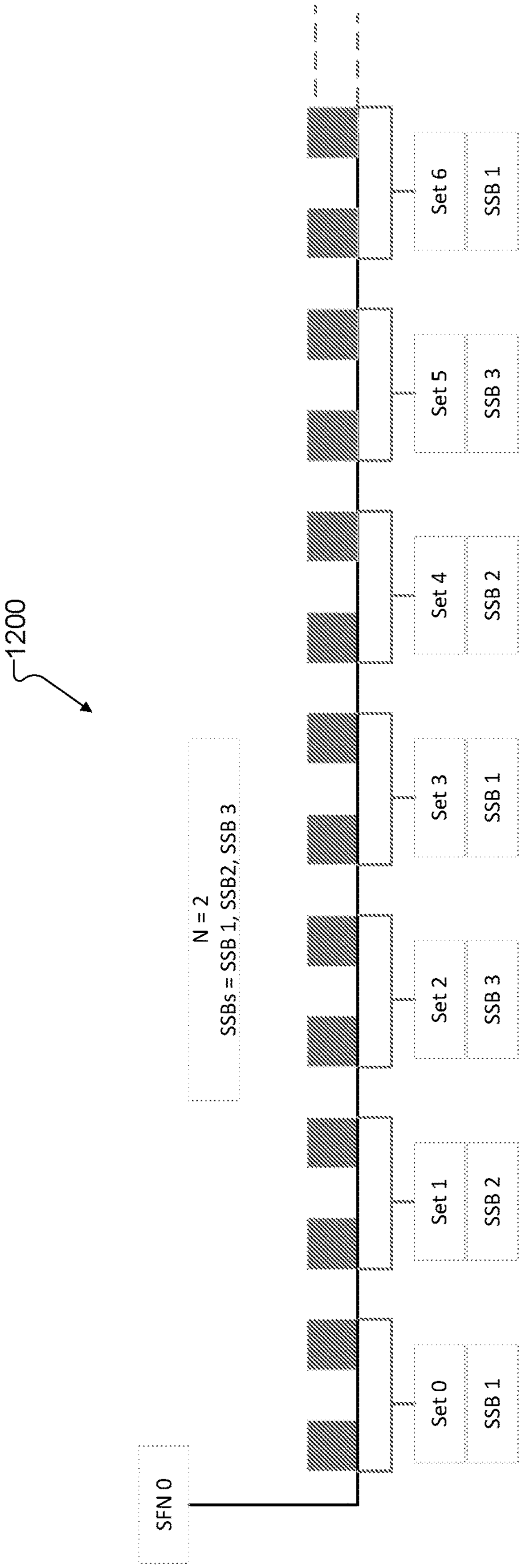
FIG. 12 illustrates an example of RO grouping according to embodiments of the present disclosure.
Figure 13:
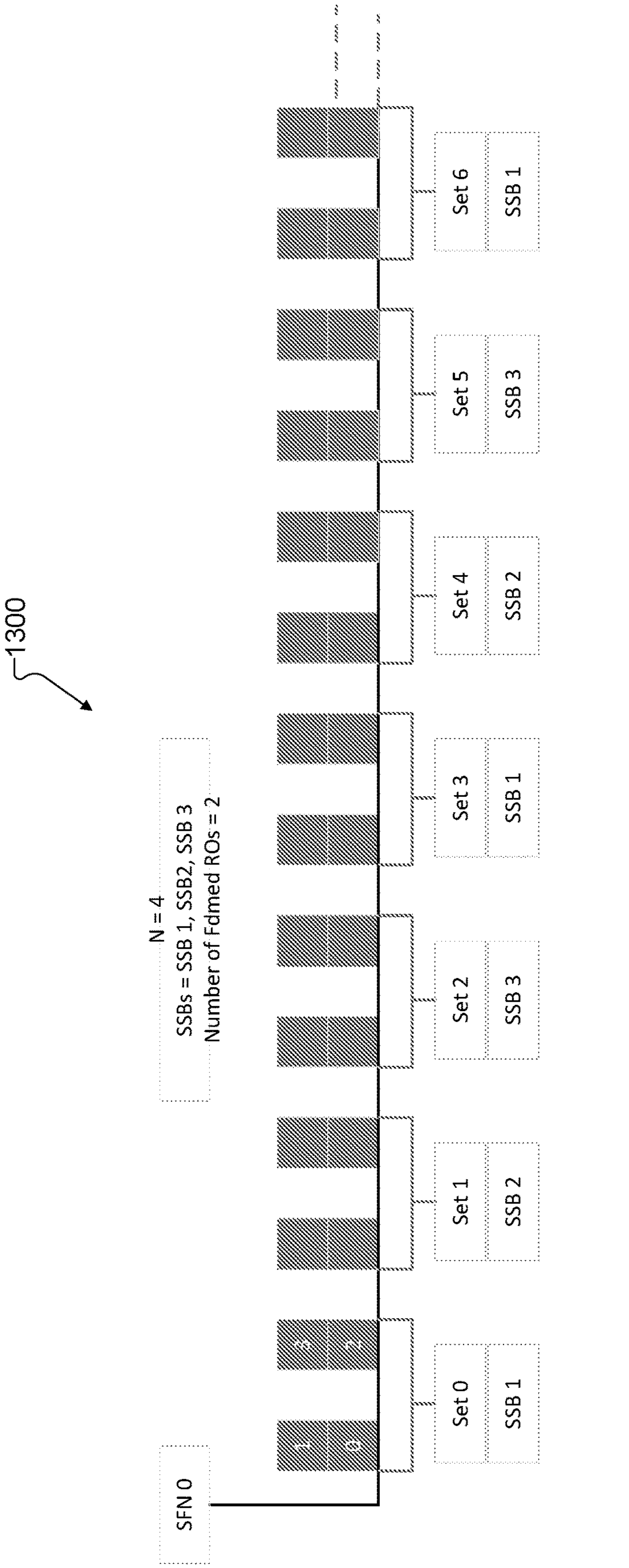
FIG. 13 illustrates an example of RO grouping according to embodiments of the present disclosure.

In one embodiment, for 4 step RA resource configuration for multiple PRACH transmissions within a RACH attempt, the valid ROs (for paired spectrum or supplementary uplink band all PRACH occasions are valid; for unpaired spectrum the valid ROs can be as specified in TS 38.213) configured by this configuration are grouped in sets of 'N' ROs starting from SFN 0. For grouping in sets, ROs are selected first in frequency and then in time. These sets are sequentially mapped to SSBs starting from lowest SSB index to highest SSB index. Examples are shown in FIG. 12 and FIG. 13. ROs are signaled by the parameter PRACH configuration index. N is the number of PRACH transmissions within a RACH attempt. The value of N is signaled in the 4 step RA resource configuration for multiple PRACH transmissions within a RACH attempt. PRACH configuration index is signaled in the 4 step RA resource configuration for multiple PRACH transmissions within a RACH attempt.

FIG. 12 illustrates an example 1200 of RO grouping according to embodiments of the present disclosure. The embodiment of RO grouping illustrated in FIG. 12 is for illustration only. Different embodiments of RO grouping could be used without departing from the scope of this disclosure.

In the example of FIG. 12, seven sets of two ROs 0-6 are grouped into SSB indexes 1-3. Set 0, Set 3, and Set 6 correspond with SSB 1. Set 1 and Set 4 correspond with SSB2. Set 2 and Set 5 correspond with SSB3.

Although FIG. 12 illustrates an example 1200 of RO grouping, various changes may be made to FIG. 12. For example, various changes to the number of sets, the number of SSB indexes, etc. could be made according to particular needs.

FIG. 13 illustrates an example 1300 of RO grouping according to embodiments of the present disclosure. The embodiment of RO grouping illustrated in FIG. 13 is for illustration only. Different embodiments of RO grouping could be used without departing from the scope of this disclosure.

In the example of FIG. 13, seven sets of four ROs 0-6 are grouped into SSB indexes 1-3. Set 0, Set 3, and Set 6 correspond with SSB 1. Set 1 and Set 4 correspond with SSB2. Set 2 and Set 5 correspond with SSB3. Furthermore, for each set of four ROs, ROs 0 and 1 are frequency division multiplexed (FDMed), and ROs 2 and 3 are FDMed.

Although FIG. 13 illustrates an example 1300 of RO grouping, various changes may be made to FIG. 13. For example, various changes to the number of sets, the number of SSB indexes, etc. could be made according to particular needs.

Figure 14:
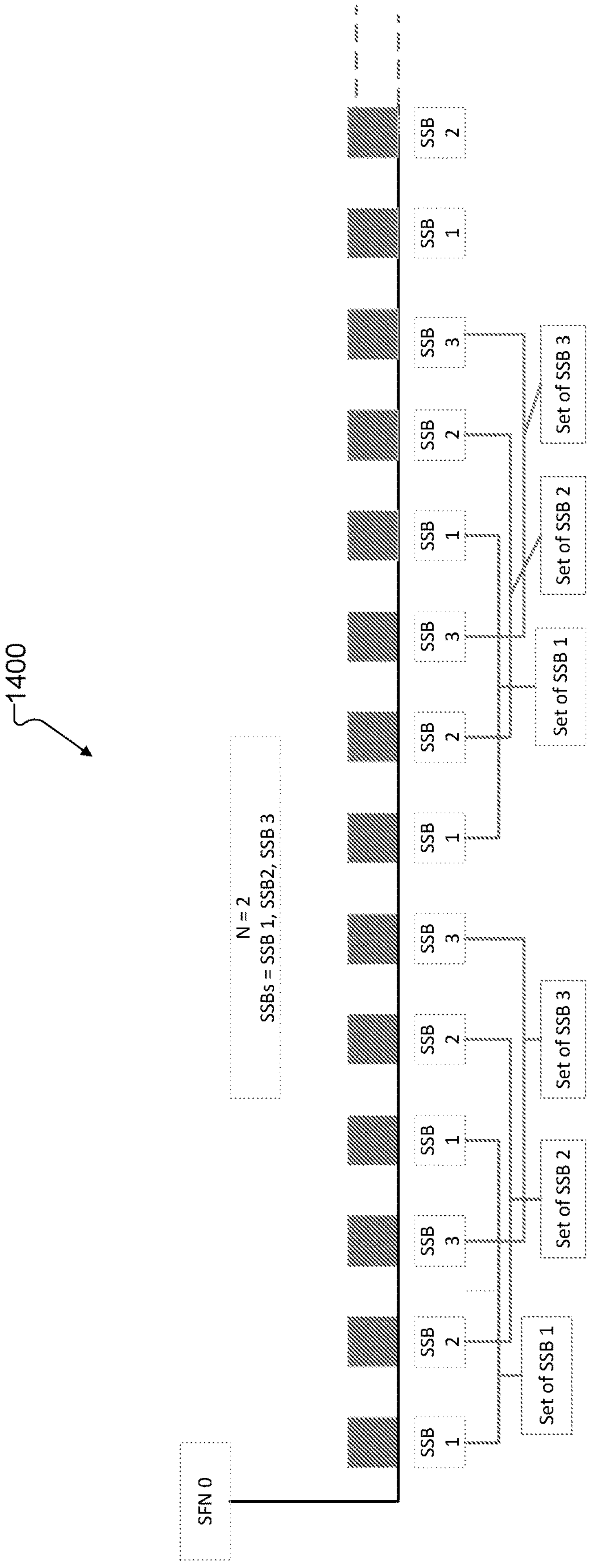
FIG. 14 illustrates an example of RO grouping according to embodiments of the present disclosure.

In another embodiment, for 4 step RA resource configuration for multiple PRACH transmissions within a RACH attempt, the valid ROs configured by this configuration are grouped in sets of 'N' ROs starting from SFN 0. For grouping in sets, the ROs are selected first in frequency and then in time. The ROs are first mapped to SSBs sequentially from the lowest SSB index to the highest SSB index. The ROs mapped to the same SSBs are then sequentially grouped into sets of 'N' ROs as shown in FIG. 14. ROs are signaled by parameter PRACH configuration index. N is the number of PRACH transmissions within a RACH attempt. The value if N is signaled in the 4 step RA resource configuration for multiple PRACH transmissions within a RACH attempt. PRACH configuration index is signaled in the 4 step RA resource configuration for multiple PRACH transmissions within a RACH attempt.

FIG. 14 illustrates an example 1400 of RO grouping according to embodiments of the present disclosure. The embodiment of RO grouping illustrated in FIG. 14 is for illustration only. Different embodiments of RO grouping could be used without departing from the scope of this disclosure.

In the example of FIG. 14, six sets of two ROs 0-6 are grouped into SSB indexes 1-3. Two of the sets correspond with SSB 1. Two of the sets correspond with SSB2. Two of the sets correspond with SSB3.

Although FIG. 14 illustrates an example 1400 of RO grouping, various changes may be made to FIG. 14. For example, various changes to the number of sets, the number of SSB indexes, etc. could be made according to particular needs.

In one embodiment, the UE selects the one of these sets of 'N' ROs (nearest available in time) corresponding to selected SSB and transmits multiple PRACH transmissions within a RACH attempt. The RA-RNTI is calculated using the kth PRACH occasion in the selected set of 'N' ROs where k is signaled by the gNB or is pre-defined (e.g., first or last or any other value). The ROs in a set are numbered in increasing order in the frequency domain and then in increasing order in the time domain. Each RO in the set is sequentially numbered (e.g., from zero), first, in increasing order frequency resource indexes for frequency multiplexed ROs, second in increasing order of time resource indexes as shown in FIG. 13.

$$\text{RA-RNTI}=1+s\_id+14\times t\_id+14\times 80\times f\_id+14\times 80\times 8\times ul\_carrier\_id$$

where s_id is the index of the first OFDM symbol of the kth PRACH occasion in selected set ($0\le s\_id<14$), t_id is the index of the first slot of the kth PRACH occasion of selected set in a system frame ($0\le t\_id<80$), where the subcarrier spacing to determine t_id is based on the value of μ specified in clause 5.3.2 in TS 38.211 [8] for μ={0, 1, 2, 3}, and for μ={5, 6}, t_id is the index of the 120 kHz slot in a system frame that contains the kth PRACH occasion of selected set ($0\le t\_id<80$), f_id is the index of the PRACH occasion in the frequency domain ($0\le f\_id<8$), and ul_carrier_id is the UL carrier used for Random Access Preamble transmission (0 for NUL carrier, and 1 for SUL carrier).

In one embodiment, the UE monitors PDCCH for this RA-RNTI in the RAR window. In one embodiment, the RAR window starts at the first available PDCCH monitoring occasion (amongst the monitoring occasions signaled by the RAR search space) which is at least one symbol away from the end of PRACH occasion in which the first PRACH transmission is performed by the UE. In another embodiment, the RAR window starts at the first available PDCCH monitoring occasion (amongst the monitoring occasions signaled by RAR search space) which is at least one symbol away from the end of the PRACH occasion in which the last PRACH transmission is performed by the UE.

In one embodiment, random access can be initiated by the network (e.g., a gNB) by sending a PDCCH order to UE. The PDCCH order includes an SUL/NUL indication and a Preamble index. The Preamble index can be set to zero (for CBRA) or non zero (for CFRA). In the case of CFRA, the PDCCH order also includes and SSB index. For random access initiated by the PDCCH order, the UE performs a 4 step random access procedure where the UE does not repeat Msg1 (i.e., PRACH preamble) during the PRACH attempt.

The PDCCH ordered initiated random access procedure should be enhanced to enable Msg1 repetitions to provide extended coverage to RRC Connected UEs.

In one embodiment, if the PDCCH order is initiated for the serving cell, the UE applies the operation as described below herein. In one embodiment, If the PDCCH order is initiated for a non serving cell (e.g., to determine the TA of a candidate cell for L1/L2 triggered mobility (LTM)), the UE does not apply Msg1 repetitions. Alternately, if the PDCCH order is initiated for a non serving cell (e.g., to determine the TA of a candidate cell for L1/L2 triggered mobility (LTM)), the UE applies the operation as described below herein.

In one embodiment, the rsrp-ThresholdPRACHRepetitons for a specific number of repetitions can be signaled in a BWP configuration or in a RACH configuration specific to the number of repetitions or it can be commonly signaled for all BWPs of a cell.

In one embodiment, the UE receives the random access configuration(s) and relevant parameters from gNB in RRC message or system information for one or more cells, the UE receives the PDCCH order from gNB for initiating random access procedure for a cell, the UE selects the SUL or NUL of the cell upon initiation of the random access procedure, the UE selects the BWP of the cell for the selected carrier for this random access procedure, and the UE selects the RA type as 4 step RA. For this random access procedure initiated upon reception of PDCCH order, the UE determines the number of repetitions (0/2/4/8) based on the SS-RSRP of path loss reference and availability of a RACH configuration and selects the RACH configuration as follows:

- If the 4 step RACH configuration for 8 Msg1 repetitions is configured in the BWP selected for the RA procedure and if the RSRP of the downlink pathloss reference <rsrp-ThresholdPRACHRepetitons for 8 Msg1 repetitions; or if the BWP selected for the random access procedure is configured only with the 4 step RA resource configuration for multiple PRACH transmissions within a RACH attempt with 8 Msg1 repetitions, the UE selects the 4 step RA resource configuration for multiple PRACH transmissions with 8 msg1 repetitions.
- Otherwise, if the RACH configuration for 4 Msg1 repetitions is configured in the BWP selected for the RA procedure and if the RSRP of the downlink pathloss reference <rsrp-ThresholdPRACHRepetitons for 4 Msg1 repetitions; or if the BWP selected for the random access procedure is configured only with the RA resource configuration for multiple PRACH transmissions within a RACH attempt with 4 Msg1 repetitions, the UE selects the 4 step RA resource configuration for multiple PRACH transmissions with 4 msg1 repetitions.
- Otherwise, if the RACH configuration for 2 Msg1 repetitions is configured in the BWP selected for the RA procedure and if the RSRP of the downlink pathloss reference <rsrp-ThresholdPRACHRepetitons for 2 Msg1 repetitions; or if the BWP selected for the random access procedure is configured only with the RA resource configuration for multiple PRACH transmissions within a RACH attempt with 2 Msg1 repetitions, the UE selects the 4 step RA resource configuration for multiple PRACH transmissions with 2 msg1 repetitions.
- Otherwise, the UE selects the 4 step RA resource configuration without any Msg1 repetitions.

The UE applies/uses the selected RA resource configuration (ROs, preambles (if not indicated in PDCCH order) and other RACH parameters such power ramping step, max preamble transmission, power parameters, size of RAR window, contention resolution timer etc) for the random access procedure.

In one embodiment, the UE receives the random access configuration(s) and relevant parameters from gNB in RRC message or system information for one or more cells, and the UE receives the PDCCH order from the gNB for initiating random access procedure for a cell. The PDCCH order indicates whether to perform Msg1 repetitions or not. If the preamble index in PDCCH order is not zero and Msg1 repetitions is indicated in the PDCCH order (i.e., PDCCH order indicates that UE should repeat Msg1), the network will reserve the indicated preamble from CFRA preambles of each of the RACH configuration corresponding to 2/4/8 Msg1 repetitions to avoid any contention. Alternately, if Msg1 repetitions is indicated in the PDCCH order (i.e., the PDCCH order indicates that the UE should repeat Msg1), the network may indicate multiple preamble indexes, each corresponding to a different number of Msg1 repetitions, and the UE uses the preamble corresponding to determined number of Msg1 repetitions. Additionally, the UE selects the SUL or NUL of the cell upon initiation of random access procedure, the UE selects the BWP of the cell for the selected carrier for this random access procedure, and the UE selects RA type as 4 step RA. If Msg1 repetitions are indicated in the PDCCH order (i.e., the PDCCH order indicates that the UE should repeat Msg1), at the time of initiation of the RA procedure based on the PDCCH order, the UE determines the number of repetitions (2/4/8) based on the SS-RSRP of the path loss reference and availability of the RACH configuration and selects the RACH configuration as follows:

- If the 4 step RACH configuration for 8 Msg1 repetitions is configured in the BWP selected for the RA procedure and if the RSRP of the downlink pathloss reference <rsrp-ThresholdPRACHRepetitons for 8 Msg1 repetitions; or if the BWP selected for the random access procedure is configured only with the 4 step RA resource configuration for multiple PRACH transmissions within a RACH attempt with 8 Msg1 repetitions, the UE selects the 4 step RA resource configuration for multiple PRACH transmissions with 8 msg1 repetitions.
- Otherwise, if the RACH configuration for 4 Msg1 repetitions is configured in the BWP selected for the RA procedure and if the RSRP of the downlink pathloss reference <rsrp-ThresholdPRACHRepetitons for 4 Msg1 repetitions; or if the BWP selected for the random access procedure is configured only with the RA resource configuration for multiple PRACH transmissions within a RACH attempt with 4 Msg1 repetitions, the UE selects the 4 step RA resource configuration for multiple PRACH transmissions with 4 msg1 repetitions.

- Otherwise, if the RACH configuration for 2 Msg1 repetitions is configured in the BWP selected for the RA procedure and if the RSRP of the downlink pathloss reference <rsrp-ThresholdPRACHRepetitons for 2 Msg1 repetitions; or if the BWP selected for the random access procedure is configured only with the RA resource configuration for multiple PRACH transmissions within a RACH attempt with 2 Msg1 repetitions, the UE selects the 4 step RA resource configuration for multiple PRACH transmissions with 2 msg1 repetitions.
- Otherwise the UE selects 4 step RA resource configuration without any Msg1 repetitions.

In one embodiment, if Msg1 repetitions are indicated in the PDCCH order (i.e., the PDCCH order indicates that UE should repeat Msg1), at the time of initiation of the RA procedure based on the PDCCH order, the UE determines the number of repetitions (2/4/8) based on the SS-RSRP of the path loss reference and availability of the RACH configuration and selects the RACH configuration as follows:

- If the 4 step RACH configuration for 8 Msg1 repetitions is configured in the BWP selected for the RA procedure and if the RSRP of the downlink pathloss reference <rsrp-ThresholdPRACHRepetitons for 8 Msg1 repetitions; or if the BWP selected for random access procedure is configured only with 4 step RA resource configuration for multiple PRACH transmissions within a RACH attempt with 8 Msg1 repetitions, the UE selects the 4 step RA resource configuration for multiple PRACH transmissions with 8 msg1 repetitions.
- Otherwise, if the RACH configuration for 4 Msg1 repetitions is configured in the BWP selected for the RA procedure and if the RSRP of the downlink pathloss reference <rsrp-ThresholdPRACHRepetitons for 4 Msg1 repetitions; or if the BWP selected for the random access procedure is configured only with the RA resource configuration for multiple PRACH transmissions within a RACH attempt with 4 Msg1 repetitions, the UE selects the 4 step RA resource configuration for multiple PRACH transmissions with 4 msg1 repetitions.
- Otherwise, the UE selects the 4 step RA resource configuration for multiple PRACH transmissions with 2 msg1 repetitions.

In one embodiment, if Msg1 repetitions are not indicated in the PDCCH order (i.e., the PDCCH order indicates that the UE should not repeat Msg1), at the time of initiation of the RA procedure based on the PDCCH order, the UE selects the RACH resource configuration not associated with msg1 repetitions, from the RACH resource configurations of the BWP selected (of cell for which network has sent PDCCH order) for RA procedure.

In one embodiment, the UE applies/uses the selected RA resource configuration (ROs, preambles (if not indicated in PDCCH order) and other RACH parameters such power ramping step, max preamble transmission, power parameters, size of RAR window, contention resolution timer etc) for the random access procedure.

In one embodiment, the UE receives the random access configuration(s) and relevant parameters from the gNB in a RRC message or system information for one or more cells, and the UE receives a PDCCH order from the gNB for initiating a random access procedure for a cell. The PDCCH order can indicate a number of Msg1 repetitions (0/2/4/8). Absence of a number of repetitions or the number of Msg1 repetitions set to 0 indicates that the UE does not perform Msg1 repetitions. If the preamble index in the PDCCH order is not zero and the number of Msg1 repetitions is indicated in the PDCCH order (i.e., PDCCH order indicates that UE should repeat Msg1 a specific number of times), the network will reserve the indicated preamble from the CFRA preambles of the RACH configuration corresponding to the indicated number of Msg1 repetitions to avoid any contention. Additionally, the UE selects the SUL or NUL of the cell upon initiation of random access procedure, the UE selects the BWP of the cell for the selected carrier for this random access procedure, and the UE selects RA type as 4 step RA.

In one embodiment, if the number of Msg1 repetitions (2/4/8) are indicated in the PDCCH order, at the time of initiation of the RA procedure based on the PDCCH order, the UE selects the 4 step RACH resource configuration corresponding to the indicated number of repetitions, from the RACH resource configurations of the BWP selected (of the cell for which the network has sent the PDCCH order) for the RA procedure.

In one embodiment, if the number of Msg1 repetitions (2/4/8) are not indicated in the PDCCH order or the number of Msg1 repetitions is set to 0, at the time of initiation of the RA procedure based on the PDCCH order, the UE selects the 4 step RACH resource configuration not associated with msg1 repetitions, from the RACH resource configurations of the BWP selected (of the cell for which the network has sent the PDCCH order) for the RA procedure.

In one embodiment, the UE applies/uses the selected RA resource configuration (ROs, preambles [if not indicated in PDCCH order] and other RACH parameters such as power ramping step, max preamble transmission, power parameters, size of RAR window, contention resolution timer etc.) for the random access procedure.

In one embodiment, the UE receives the random access configuration(s) and relevant parameters from the gNB in the RRC message or system information for one or more cells, the UE receives PDCCH order from gNB for initiating random access procedure for a cell. PDCCH order can indicate RACH configuration index, the UE selects the SUL or NUL of the cell upon initiation of random access procedure, the UE selects the BWP of the cell for the selected carrier for this random access procedure, and the UE selects RA type as 4 step RA.

If the RACH configuration index is indicated in the PDCCH order, at the time of initiation of the RA procedure based on the PDCCH order, the UE selects the RACH resource configuration corresponding to the indicated index, from the RACH resource configurations of the BWP selected (of the cell for which network has sent the PDCCH order) for the RA procedure. Depending on the number of Msg1 repetitions configured in the selected RACH configuration, the UE repeats Msg1. The RACH configuration index can be explicitly signaled in each RACH resource configuration or each RACH resource configuration can be sequentially indexed from zero.

In one embodiment, the UE applies/uses the selected RA resource configuration (ROs, preambles [if not indicated in PDCCH order] and other RACH parameters such as power ramping step, max preamble transmission, power parameters, size of RAR window, contention resolution timer etc.) for the random access procedure.

In one embodiment, the UE receives the random access configuration(s) and relevant parameters from gNB in RRC message or system information for one or more cells, the UE receives the PDCCH order from gNB for initiating random access procedure for a cell, the UE selects the SUL or NUL of the cell upon initiation of random access procedure, the UE selects the BWP of the cell for the selected carrier for this random access procedure, and UE selects RA type as 4 step RA.

In one embodiment, if the PDCCH order includes a non zero preamble index:

the PDCCH order indicates whether to perform Msg1 repetitions or not. The network will reserve the indicated preamble from CFRA preambles of each of the RACH configurations corresponding to 2/4/8 Msg1 repetitions to avoid any contention. Alternately, if Msg1 repetitions is indicated in the PDCCH order (i.e., the PDCCH order indicates that UE should repeat Msg1), the network may indicate multiple preamble indexes, each corresponding to a different number of Msg1 repetitions, the UE uses the preamble corresponding to the determined number of Msg1 repetitions.

If Msg1 repetitions are indicated in PDCCH order (i.e., the PDCCH order indicates that UE should repeat Msg1), at the time of initiation of RA procedure based on the PDCCH order, the UE determines the number of repetitions (2/4/8) based on the SS-RSRP of path loss reference and availability of RACH configuration and select the RACH configuration as described herein.

The UE applies/uses the selected RA resource configuration (ROs, preambles [if not indicated in PDCCH order [and other RACH parameters such power ramping step, max preamble transmission, power parameters, size of RAR window, contention resolution timer etc) for the random access procedure.

In one embodiment, if the PDCCH order includes a non zero preamble index:

The PDCCH order can indicate number of Msg1 repetitions (0/2/4/8). Absence of number of repetitions or number of Msg1 repetitions set to 0 indicates that the UE does not perform Msg1 repetitions. If the number of Msg1 repetitions is indicated in the PDCCH order (i.e., the PDCCH order indicates that the UE should repeat Msg1 a specific number of times), the network will reserve the indicated preamble from the CFRA preambles of the RACH configuration corresponding to the indicated number of Msg1 repetitions to avoid any contention.

If the number of Msg1 repetitions (2/4/8) are indicated in PDCCH order, at the time of initiation of the RA procedure based on the PDCCH order, the UE selects the 4 step RACH resource configuration corresponding to the indicated number of repetitions, from the RACH resource configurations of the BWP selected (of the cell for which the network has sent PDCCH order) for RA procedure.

If number of Msg1 repetitions (2/4/8) are not indicated in the PDCCH order or number of Msg1 repetitions is set to 0, at the time of initiation of RA procedure based on the PDCCH order, the UE selects the 4 step RACH resource configuration not associated with msg1 repetitions, from the RACH resource configurations of BWP selected (of cell for which network has sent PDCCH order) for RA procedure.

The UE applies/uses the selected RA resource configuration (ROs, preambles [if not indicated in PDCCH order] and other RACH parameters such power ramping step, max preamble transmission, power parameters, size of RAR window, contention resolution timer etc.) for the random access procedure.

In one embodiment, if the PDCCH order includes a non zero preamble index:

The PDCCH order can indicate RACH configuration index.

If the RACH configuration index is indicated in the PDCCH order, at the time of initiation of the RA procedure based on the PDCCH order, the UE selects the RACH resource configuration corresponding to the indicated index, from the RACH resource configurations of the BWP selected (of the cell for which the network has sent the PDCCH order) for the RA procedure. Depending on the number of Msg1 repetitions configured in the selected RACH configuration, the UE repeats Msg1.

The UE applies/uses the selected RA resource configuration (ROs, preambles [if not indicated in PDCCH order] and other RACH parameters such power ramping step, max preamble transmission, power parameters, size of RAR window, contention resolution timer etc.) for the random access procedure.

In one embodiment, the UE receives the random access configuration(s) and relevant parameters from the gNB in the RRC message or system information for one or more cells, the UE receives PDCCH order from gNB for initiating random access procedure for a cell. PDCCH order may indicate whether to perform Msg1 repetitions, the UE selects the SUL or NUL of the cell upon initiation of random access procedure, the UE selects the BWP of the cell for the selected carrier for this random access procedure, and the UE selects RA type as 4 step RA.

If Msg1 repetitions are indicated in the PDCCH order, at the time of initiation of the RA procedure based on the PDCCH order, the UE determines the number of repetitions (2/4/8) based on SS-RSRP of path loss reference as follows:

If the 4 step RACH configuration for 8 Msg1 repetitions is configured in the BWP selected for the RA procedure and if the RSRP of the downlink pathloss reference <rsrp-ThresholdPRACHRepetitons for 8 Msg1 repetitions; or if the BWP selected for the random access procedure is configured only with the 4 step RA resource configuration for multiple PRACH transmissions within a RACH attempt with 8 Msg1 repetitions, the UE selects the 4 step RA resource configuration for multiple PRACH transmissions with 8 msg1 repetitions.

Otherwise, if the RACH configuration for 4 Msg1 repetitions is configured in the BWP selected for the RA procedure and if the RSRP of the downlink pathloss reference <rsrp-ThresholdPRACHRepetitons for 4 Msg1 repetitions; or if the BWP selected for the random access procedure is configured only with the RA resource configuration for multiple PRACH transmissions within a RACH attempt with 4 Msg1 repetitions, the UE selects the 4 step RA resource configuration for multiple PRACH transmissions with 4 msg1 repetitions.

Otherwise, the UE selects the 4 step RA resource configuration for multiple PRACH transmissions with 2 msg1 repetitions.

If Msg1 repetitions are not indicated in PDCCH order, UE determines the number of repetitions (0/2/4/8) based on SS-RSRP of path loss reference as follows:

If the 4 step RACH configuration for 8 Msg1 repetitions is configured in the BWP selected for the RA procedure and if the RSRP of the downlink pathloss reference <rsrp-ThresholdPRACHRepetitons for 8 Msg1 repetitions; or if the BWP selected for the random access procedure is configured only with the 4 step RA resource configuration for multiple PRACH transmissions within a RACH attempt with 8 Msg1 repetitions, the UE selects the 4 step RA resource configuration for multiple PRACH transmissions with 8 msg1 repetitions.

Otherwise, if the RACH configuration for 4 Msg1 repetitions is configured in the BWP selected for the RA procedure and if the RSRP of the downlink pathloss reference <rsrp-ThresholdPRACHRepetitons for 4 Msg1 repetitions; or if the BWP selected for the random access procedure is configured only with the RA resource configuration for multiple PRACH transmissions within a RACH attempt with 4 Msg1 repetitions, the UE selects the 4 step RA resource configuration for multiple PRACH transmissions with 4 msg1 repetitions.

Otherwise, if the RACH configuration for 2 Msg1 repetitions is configured in the BWP selected for the RA procedure and if the RSRP of the downlink pathloss reference <rsrp-ThresholdPRACHRepetitons for 2 Msg1 repetitions; or if the BWP selected for random access procedure is configured only with the RA resource configuration for multiple PRACH transmissions within a RACH attempt with 2 Msg1 repetitions, the UE selects the 4 step RA resource configuration for multiple PRACH transmissions with 2 msg1 repetitions.

Otherwise, the UE selects the 4 step RA resource configuration without any Msg1 repetitions.

In one embodiment, the UE applies/uses the selected RA resource configuration (ROs, preambles [if not indicated in PDCCH order] and other RACH parameters such power ramping step, max preamble transmission, power parameters, size of RAR window, contention resolution timer etc) for the random access procedure.

In one embodiment, the UE receives the random access configuration(s) and relevant parameters from the gNB in the RRC message or system information for one or more cells, the UE receives the PDCCH order from gNB for initiating random access procedure for a cell. PDCCH order may indicate number of Msg1 repetitions, the UE selects the SUL or NUL of the cell upon initiation of random access procedure, the UE selects the BWP of the cell for the selected carrier for this random access procedure, and UE selects RA type as 4 step RA.3

If the number of Msg1 repetitions (2/4/8) are indicated in the PDCCH order, at the time of the initiation of the RA procedure based on the PDCCH order, the UE selects the RACH resource configuration corresponding to the indicated number of repetitions, from the RACH resource configurations of the BWP selected (of cell for which network has sent PDCCH order) for RA procedure.

If the number of Msg1 repetitions (2/4/8) are not indicated in PDCCH order:

If the 4 step RACH configuration for 8 Msg1 repetitions is configured in the BWP selected for the RA procedure and if the RSRP of the downlink pathloss reference <rsrp-ThresholdPRACHRepetitons for 8 Msg1 repetitions; or if the BWP selected for the random access procedure is configured only with the 4 step RA resource configuration for multiple PRACH transmissions within a RACH attempt with 8 Msg1 repetitions, the UE selects the 4 step RA resource configuration for multiple PRACH transmissions with 8 msg1 repetitions.

Otherwise, if the RACH configuration for 4 Msg1 repetitions is configured in the BWP selected for the RA procedure and if the RSRP of the downlink pathloss reference <rsrp-ThresholdPRACHRepetitons for 4 Msg1 repetitions; or if the BWP selected for the random access procedure is configured only with the RA resource configuration for multiple PRACH transmissions within a RACH attempt with 4 Msg1 repetitions, the UE selects the 4 step RA resource configuration for multiple PRACH transmissions with 4 msg1 repetitions.

Otherwise if the RACH configuration for 2 Msg1 repetitions is configured in the BWP selected for RA procedure and if RSRP of the downlink pathloss reference <rsrp-ThresholdPRACHRepetitons for 2 Msg1 repetitions; or if the BWP selected for the random access procedure is configured only with the RA resource configuration for multiple PRACH transmissions within a RACH attempt with 2 Msg1 repetitions, the UE selects the 4 step RA resource configuration for multiple PRACH transmissions with 2 msg1 repetitions.

Otherwise, UE selects 4 step RA resource configuration without any Msg1 repetitions.

In one embodiment, the UE applies/uses the selected RA resource configuration (ROs, preambles [if not indicated in PDCCH order] and other RACH parameters such power ramping step, max preamble transmission, power parameters, size of RAR window, contention resolution timer etc.) for the random access procedure.

In one embodiment, random access can be initiated by the network (i.e., a gNB) by including Reconfiguration with Sync IE in RRCReconfiguration message. Reconfiguration with Sync IE may optionally include a CFRA configuration for SUL or a CFRA configuration for NUL. The CFRA config includes a list of one or more of a Preamble index, SSB index, and PUSCH occasion index (for 2 step RA only).

In one embodiment, for 4 step random access initiated for Reconfiguration with Sync, the UE performs a 4 step random access procedure where the UE does not repeat Msg1 (i.e., PRACH preamble) during the PRACH attempt. The 4 step random access initiated for Reconfiguration with Sync should be enhanced to enable Msg1 repetitions to provide extended coverage to RRC Connected UEs.

The rsrp-ThresholdPRACHRepetitons for specific number of repetitions can be signaled in BWP configuration or in RACH configuration specific to number of repetitions or it can be commonly signaled for all BWPs of a cell or can be signaled in reconfiguration with sync IE or can be signaled in dedicated RACH configuration of cell.

In one embodiment, the UE receives the random access configuration(s) and relevant parameters from the gNB in the RRC RRCReconfiguration message for a SpCell, and the UE receives the Reconfiguration with Sync IE for a SpCell in the RRCReconfiguration message. Upon receiving the Reconfiguration with Sync IE for a SpCell in the RRCReconfiguration message, UE initiate random access procedure towards the SpCell. The UE selects the SUL or NUL of the SpCell upon initiation of random access procedure, the UE selects the BWP of the SpCell for the selected carrier for this random access procedure, and UE selects RA type as 4 step RA.

For this 4 step random access procedure initiated upon reception of Reconfiguration with Sync IE, the UE determines the number of repetitions (0/2/4/8) based on the SS-RSRP of path loss reference and availability of the RACH configuration in the selected BWP of the SpCell and selects the RACH configuration as follows:

If the 4 step RACH configuration for 8 Msg1 repetitions is configured in the BWP selected for RA procedure and if the RSRP of the downlink pathloss reference <rsrp-ThresholdPRACHRepetitons for 8 Msg1 repetitions; or if the BWP selected for the random access procedure is configured only with the 4 step RA resource configuration for multiple PRACH transmissions within a RACH attempt with 8 Msg1 repetitions, the UE selects the 4 step RA resource configuration for multiple PRACH transmissions with 8 msg1 repetitions.

Otherwise, if the RACH configuration for 4 Msg1 repetitions is configured in the BWP selected for the RA procedure and if the RSRP of the downlink pathloss reference <rsrp-ThresholdPRACHRepetitons for 4 Msg1 repetitions; or if the BWP selected for the random access procedure is configured only with the RA resource configuration for multiple PRACH transmissions within a RACH attempt with 4 Msg1 repetitions, the UE selects the 4 step RA resource configuration for multiple PRACH transmissions with 4 msg1 repetitions.

Otherwise, if the RACH configuration for 2 Msg1 repetitions is configured in the BWP selected for the RA procedure and if the RSRP of the downlink pathloss reference <rsrp-ThresholdPRACHRepetitons for 2 Msg1 repetitions; or If the BWP selected for the random access procedure is configured only with the RA resource configuration for multiple PRACH transmissions within a RACH attempt with 2 Msg1 repetitions, the UE selects the 4 step RA resource configuration for multiple PRACH transmissions with 2 msg1 repetitions.

Otherwise, the UE selects 4 step RA resource configuration without any Msg1 repetitions.

In one embodiment, the UE applies/uses the selected RA resource configuration for the random access procedure and applies Msg1 repetitions if the selected RA resource configuration corresponds to Msg1 repetitions.

In one embodiment, the UE receives the random access configuration(s) and relevant parameters from the gNB in an RRC RRCReconfiguration message for SpCell, and the UE receives a Reconfiguration with Sync IE for a SpCell in the RRCReconfiguration message. The RRCReconfiguration message indicates (e.g., in a SpCell configuration or in a Reconfiguration with Sync IE) whether to perform Msg1 repetitions or not for the SpCell. Upon receiving the Reconfiguration with Sync IE for a SpCell in the RRCReconfiguration message, the UE initiates random access procedure towards the SpCell, the UE selects the SUL or NUL of the SpCell upon initiation of random access procedure, the UE selects the BWP of the SpCell for the selected carrier for this random access procedure, and the UE selects the RA type as 4 step RA.

If CFRA resources are configured (e.g., in Reconfiguration with Sync IE) for 4 step RA towards SpCell and Msg1 repetitions is indicated, the network will reserve the indicated preamble(s) from the CFRA preambles of each of RACH configuration corresponding to 2/4/8 Msg1 repetitions to avoid any contention. Alternately, if Msg1 repetitions is indicated, the network may configure multiple CFRA configuration (each config includes list of one or more [preamble index and SSB index/CSI RS index] and/or ROs), each CFRA configuration corresponding to a different number of Msg1 repetitions, and the UE uses the CFRA configuration corresponding to determined number of Msg1 repetitions.

In one embodiment, if Msg1 repetitions are indicated (i.e., the UE should repeat Msg1), at the time of initiation of the RA procedure based on the Reconfiguration with Sync, the UE determines the number of repetitions (2/4/8) based on the SS-RSRP of path loss reference and availability of the RACH configuration and selects the RACH configuration as follows:

If 4 step RACH configuration for 8 Msg1 repetitions is configured in the BWP selected for the RA procedure and if the RSRP of the downlink pathloss reference <rsrp-ThresholdPRACHRepetitons for 8 Msg1 repetitions; or if the BWP selected for the random access procedure is configured only with the 4 step RA resource configuration for multiple PRACH transmissions within a RACH attempt with 8 Msg1 repetitions, the UE selects the 4 step RA resource configuration for multiple PRACH transmissions with 8 msg1 repetitions.

Otherwise, if the RACH configuration for 4 Msg1 repetitions is configured in the BWP selected for RA procedure and if RSRP of the downlink pathloss reference <rsrp-ThresholdPRACHRepetitons for 4 Msg1 repetitions; or if the BWP selected for the random access procedure is configured only with the RA resource configuration for multiple PRACH transmissions within a RACH attempt with 4 Msg1 repetitions, the UE selects the 4 step RA resource configuration for multiple PRACH transmissions with 4 msg1 repetitions.

Otherwise, if the RACH configuration for 2 Msg1 repetitions is configured in the BWP selected for the RA procedure and if the RSRP of the downlink pathloss reference <rsrp-ThresholdPRACHRepetitons for 2 Msg1 repetitions; or if the BWP selected for the random access procedure is configured only with the RA resource configuration for multiple PRACH transmissions within a RACH attempt with 2 Msg1 repetitions, the UE selects the 4 step RA resource configuration for multiple PRACH transmissions with 2 msg1 repetitions.

Otherwise, the UE selects 4 step RA resource configuration without any Msg1 repetitions.

In one embodiment, if Msg1 repetitions are indicated (i.e., UE should repeat Msg1), at the time of initiation of the RA procedure based on the Reconfiguration with Sync, the UE determines the number of repetitions (2/4/8) based on the SS-RSRP of path loss reference and availability of the RACH configuration and select the RACH configuration as follows:

If the 4 step RACH configuration for 8 Msg1 repetitions is configured in the BWP selected for the RA procedure and if the RSRP of the downlink pathloss reference <rsrp-ThresholdPRACHRepetitons for 8 Msg1 repetitions; or if the BWP selected for the random access procedure is configured only with the 4 step RA resource configuration for multiple PRACH transmissions within a RACH attempt with 8 Msg1 repetitions, the UE selects the 4 step RA resource configuration for multiple PRACH transmissions with 8 msg1 repetitions.

Otherwise, if the RACH configuration for 4 Msg1 repetitions is configured in the BWP selected for the RA procedure and if the RSRP of the downlink pathloss reference <rsrp-ThresholdPRACHRepetitons for 4 Msg1 repetitions; or if the BWP selected for the random access procedure is configured only with the RA resource configuration for multiple PRACH transmissions within a RACH attempt with 4 Msg1 repetitions, the UE selects the 4 step RA resource configuration for multiple PRACH transmissions with the 4 msg1 repetitions.

Otherwise, the UE selects the 4 step RA resource configuration for multiple PRACH transmissions with 2 msg1 repetitions.

In one embodiment, if Msg1 repetitions are not indicated (i.e., the UE should not repeat Msg1), at the time of initiation of the RA procedure based on the Reconfiguration with Sync, the UE selects the RACH resource configuration not associated with msg1 repetitions, from the RACH resource configurations of the BWP selected (of the Spcell for which network has sent Reconfiguration with Sync) for the RA procedure.

In one embodiment, the UE applies/uses the selected RA resource configuration for the random access procedure and applies Msg1 repetitions if the selected RA resource configuration corresponds to the Msg1 repetitions.

In one embodiment, the UE receives a Reconfiguration with Sync IE for a SpCell in a RRCReconfiguration message. The RRCReconfiguration message (e.g., in a SpCell configuration or in a Reconfiguration with Sync IE) can indicate a number of Msg1 repetitions (0/2/4/8). Absence of a number of repetitions or number of Msg1 repetitions set to 0 indicates that the UE does not perform Msg1 repetitions. Upon receiving the Reconfiguration with Sync IE for a SpCell in RRCReconfiguration message, the UE initiates random access procedure towards the SpCell, the UE selects the SUL or NUL of the SpCell upon initiation of random access procedure, the UE selects the BWP of the SpCell for the selected carrier for this random access procedure, and the UE selects the RA type as 4 step RA.

If a number of Msg1 repetitions (2/4/8) are indicated, at the time of initiation of RA procedure based on the Reconfiguration with Sync, the UE selects the 4 step RACH resource configuration corresponding to indicated number of repetitions, from the RACH resource configurations of the BWP selected (of the Spcell for which network has sent Reconfiguration with Sync) for RA procedure.

If a number of Msg1 repetitions (2/4/8) are not indicated or number of Msg1 repetitions is set to 0, at the time of initiation of RA procedure based on the Reconfiguration with Sync, the UE selects the 4 step RACH resource configuration not associated with msg1 repetitions, from RACH resource configurations of the BWP selected (of the Spcell for which network has sent Reconfiguration with Sync) for RA procedure.

In one embodiment, the UE applies/uses the selected RA resource configuration for the random access procedure and applies Msg1 repetitions if selected RA resource configuration corresponds to Msg1 repetitions.

In one embodiment, the UE receives a Reconfiguration with Sync IE for a SpCell in a RRCReconfiguration message. The RRCReconfiguration message (e.g., in a SpCell configuration or in a Reconfiguration with Sync IE) can indicate a RACH configuration index. Upon receiving the Reconfiguration with Sync IE for a SpCell in RRCReconfiguration message, UE initiate random access procedure towards the SpCell, the UE selects the SUL or NUL of the cell upon initiation of random access procedure, the UE selects the BWP of the cell for the selected carrier for this random access procedure, and the UE selects RA type as 4 step RA.

If the RACH configuration index is indicated, at the time of initiation of RA procedure based on the Reconfiguration with Sync, the UE selects the RACH resource configuration corresponding to indicated index, from the RACH resource configurations of the BWP selected (of the Spcell for which network has sent Reconfiguration with Sync) for the RA procedure. Depending on number of Msg1 repetitions configured in the selected RACH configuration, the UE repeats Msg1. The RACH configuration index can be explicitly signaled in each RACH resource configurations or each RACH resource configuration can be sequentially indexed from zero.

In one embodiment, the UE applies/uses the selected RA resource configuration for the random access procedure and applies the Msg1 repetitions if the selected RA resource configuration corresponds to the Msg1 repetitions.

In one embodiment, the UE receives a Reconfiguration with Sync IE for a SpCell in a RRCReconfiguration message. Upon receiving the Reconfiguration with Sync IE for a SpCell in the RRCReconfiguration message, the UE initiate random access procedure towards the SpCell, the UE selects the SUL or NUL of the SpCell upon initiation of random access procedure, the UE selects the BWP of the SpCell for the selected carrier for this random access procedure, and the UE selects RA type as 4 step RA.

In one embodiment, if the Reconfiguration with Sync IE includes 4 step CFRA configuration:

The RRCReconfiguration message can indicate (e.g., in the SpCell configuration or in the Reconfiguration with Sync IE or in the 4 step CFRA configuration) whether to perform Msg1 repetitions or not for SpCell.

If Msg1 repetitions is indicated, the network will reserve the indicated preamble(s) from the CFRA preambles of each of the RACH configurations corresponding to 2/4/8 Msg1 repetitions to avoid any contention. Alternately, if Msg1 repetitions is indicated, the network may configure multiple CFRA configurations (each config includes a list of one or more [preamble index and SSB index/CSI RS index] and/or ROs), each CFRA configuration corresponding to a different number of Msg1 repetitions, and the UE uses the CFRA configuration corresponding to the determined number of Msg1 repetitions.

If Msg1 repetitions are indicated (i.e., the UE should repeat Msg1), at the time of initiation of RA procedure based on the Reconfiguration with Sync, the UE determines the number of repetitions (2/4/8) based on the SS-RSRP of path loss reference and availability of the RACH configuration and selects the RACH configuration as described herein.

The UE applies/uses the selected RA resource configuration for the random access procedure and applies Msg1 repetitions if selected RA resource configuration corresponds to Msg1 repetitions.

In one embodiment, if the Reconfiguration with Sync IE includes 4 step CFRA configuration:

The RRCReconfiguration message can (e.g., in the SpCell configuration or in Reconfiguration with Sync IE or in 4 step CFRA configuration) indicate number of Msg1 repetitions (0/2/4/8). Absence of a number of repetitions or a number of Msg1 repetitions set to 0 indicates that UE does not perform Msg1 repetitions.

If the number of Msg1 repetitions (2/4/8) are indicated, at the time of initiation of the RA procedure based on the Reconfiguration with Sync, the UE selects the 4 step RACH resource configuration corresponding to the indicated number of repetitions, from the RACH resource configurations of BWP selected (of the Spcell for which the network has sent Reconfiguration with Sync) for the RA procedure.

If the number of Msg1 repetitions (2/4/8) are not indicated or the number of Msg1 repetitions is set to 0, at the time of initiation of RA procedure based on the Reconfiguration with Sync, the UE selects the 4 step RACH resource configuration not associated with msg1 repetitions, from the RACH resource configurations of BWP selected (of the Spcell for which network has sent Reconfiguration with Sync) for RA procedure.

The UE applies/uses the selected RA resource configuration for the random access procedure and applies Msg1 repetitions if the selected RA resource configuration corresponds to Msg1 repetitions.

In one embodiment, if the Reconfiguration with Sync IE includes 4 step CFRA configuration:

The RRCReconfiguration message can (e.g., in SpCell configuration or in Reconfiguration with Sync IE or in 4 step CFRA configuration) indicate a RACH configuration index.

If the RACH configuration index is indicated, at the time of initiation of the RA procedure based on the Reconfiguration with Sync, the UE selects the RACH resource configuration corresponding to the indicated index, from the RACH resource configurations of the BWP selected (of the Spcell for which network has sent Reconfiguration with Sync) for the RA procedure. Depending on the number of Msg1 repetitions configured in the selected RACH configuration, the UE repeats Msg1. The RACH configuration index can be explicitly signaled in each RACH resource configuration or each RACH resource configuration can be sequentially indexed from zero.

The UE applies/uses the selected RA resource configuration for the random access procedure and applies Msg1 repetitions if selected RA resource configuration corresponds to Msg1 repetitions.

In one embodiment, the UE receives the random access configuration(s) and relevant parameters from gNB in RRC RRCReconfiguration message for SpCell, and the UE receives a Reconfiguration with Sync IE for a SpCell in a RRCReconfiguration message. The RRCReconfiguration message indicates (e.g., in a SpCell configuration or in a Reconfiguration with Sync IE) whether to perform Msg1 repetitions or not for the SpCell. Upon receiving the Reconfiguration with Sync IE for a SpCell in the RRCReconfiguration message, the UE initiate random access procedure towards the SpCell, the UE selects the SUL or NUL of the cell upon initiation of random access procedure, the UE selects the BWP of the cell for the selected carrier for this random access procedure, and the UE selects RA type as 4 step RA.

In one embodiment, if Msg1 repetitions are indicated (i.e., the UE should repeat Msg1), at the time of initiation of the RA procedure based on the Reconfiguration with Sync, the UE determines the number of repetitions (2/4/8) based on the SS-RSRP of path loss reference and availability of the RACH configuration and selects the RACH configuration as follows:

If the 4 step RACH configuration for 8 Msg1 repetitions is configured in the BWP selected for the RA procedure and if the RSRP of the downlink pathloss reference <rsrp-ThresholdPRACHRepetitons for 8 Msg1 repetitions; or if the BWP selected for the random access procedure is configured only with the 4 step RA resource configuration for multiple PRACH transmissions within a RACH attempt with 8 Msg1 repetitions, the UE selects the 4 step RA resource configuration for multiple PRACH transmissions with 8 msg1 repetitions.

Otherwise, If the RACH configuration for 4 Msg1 repetitions is configured in the BWP selected for the RA procedure and if the RSRP of the downlink pathloss reference <rsrp-ThresholdPRACHRepetitons for 4 Msg1 repetitions; or if the BWP selected for the random access procedure is configured only with the RA resource configuration for multiple PRACH transmissions within a RACH attempt with 4 Msg1 repetitions, the UE selects the 4 step RA resource configuration for multiple PRACH transmissions with 4 msg1 repetitions.

Otherwise, the UE selects the 4 step RA resource configuration for multiple PRACH transmissions with 2 msg1 repetitions.

In one embodiment, if Msg1 repetitions are indicated (i.e., the UE should repeat Msg1), at the time of initiation of the RA procedure based on the Reconfiguration with Sync, the UE determines the number of repetitions (0/2/4/8) based on the SS-RSRP of path loss reference and availability of the RACH configuration and selects the RACH configuration as follows:

If the 4 step RACH configuration for 8 Msg1 repetitions is configured in the BWP selected for the RA procedure and if the RSRP of the downlink pathloss reference <rsrp-ThresholdPRACHRepetitons for 8 Msg1 repetitions; or if the BWP selected for the random access procedure is configured only with the 4 step RA resource configuration for multiple PRACH transmissions within a RACH attempt with 8 Msg1 repetitions, the UE selects the 4 step RA resource configuration for multiple PRACH transmissions with 8 msg1 repetitions.

Otherwise, if the RACH configuration for 4 Msg1 repetitions is configured in the BWP selected for the RA procedure and if the RSRP of the downlink pathloss reference <rsrp-ThresholdPRACHRepetitons for 4 Msg1 repetitions; or if the BWP selected for the random access procedure is configured only with the RA resource configuration for multiple PRACH transmissions within a RACH attempt with 4 Msg1 repetitions, the UE selects the 4 step RA resource configuration for multiple PRACH transmissions with 4 msg1 repetitions.

Otherwise, if the RACH configuration for 2 Msg1 repetitions is configured in the BWP selected for the RA procedure and if the RSRP of the downlink pathloss reference <rsrp-ThresholdPRACHRepetitons for 2 Msg1 repetitions; or if the BWP selected for the random access procedure is configured only with the RA resource configuration for multiple PRACH transmissions within a RACH attempt with 2 Msg1 repetitions, the UE selects the 4 step RA resource configuration for multiple PRACH transmissions with 2 msg1 repetitions.

Otherwise, the UE selects the 4 step RA resource configuration without any Msg1 repetitions.

In one embodiment, the UE applies/uses the selected RA resource configuration for the random access procedure and applies Msg1 repetitions if selected RA resource configuration corresponds to Msg1 repetitions.

In one embodiment, the UE receives a Reconfiguration with Sync IE for a SpCell in a RRCReconfiguration message. The RRCReconfiguration message (e.g., in a SpCell configuration or in a Reconfiguration with Sync IE) can indicate a number of Msg1 repetitions (0/2/4/8). Absence of a number of repetitions or number of Msg1 repetitions set to 0 indicates that the UE does not perform Msg1 repetitions. Upon receiving the Reconfiguration with Sync IE for a SpCell in RRCReconfiguration message, UE initiate random access procedure towards the SpCell, the UE selects the SUL or NUL of the cell upon initiation of random access procedure, the UE selects the BWP of the cell for the selected carrier for this random access procedure, and the UE selects RA type as 4 step RA.

In one embodiment, if a number of Msg1 repetitions (2/4/8) are indicated, at the time of initiation of RA procedure based on the Reconfiguration with Sync, the UE selects the 4 step RACH resource configuration corresponding to indicated number of repetitions, from the RACH resource configurations of the BWP selected (of Spcell for which network has sent Reconfiguration with Sync) for RA procedure.

In one embodiment, if a number of Msg1 repetitions (2/4/8) are not indicated at the time of initiation of RA procedure based on the Reconfiguration with Sync, the UE determines the number of repetitions (0/2/4/8) based on the SS-RSRP of path loss reference and availability of the RACH configuration and selects the RACH configuration as follows:

- If the 4 step RACH configuration for 8 Msg1 repetitions is configured in the BWP selected for the RA procedure and if the RSRP of the downlink pathloss reference <rsrp-ThresholdPRACHRepetitons for 8 Msg1 repetitions; or if the BWP selected for the random access procedure is configured only with the 4 step RA resource configuration for multiple PRACH transmissions within a RACH attempt with 8 Msg1 repetitions, the UE selects the 4 step RA resource configuration for multiple PRACH transmissions with 8 msg1 repetitions.
- Otherwise, if the RACH configuration for 4 Msg1 repetitions is configured in the BWP selected for the RA procedure and if the RSRP of the downlink pathloss reference <rsrp-ThresholdPRACHRepetitons for 4 Msg1 repetitions; or if the BWP selected for the random access procedure is configured only with the RA resource configuration for multiple PRACH transmissions within a RACH attempt with 4 Msg1 repetitions, the UE selects the 4 step RA resource configuration for multiple PRACH transmissions with 4 msg1 repetitions.
- Otherwise, if the RACH configuration for 2 Msg1 repetitions is configured in the BWP selected for the RA procedure and if the RSRP of the downlink pathloss reference <rsrp-ThresholdPRACHRepetitons for 2 Msg1 repetitions; or if the BWP selected for random access procedure is configured only with the RA resource configuration for multiple PRACH transmissions within a RACH attempt with 2 Msg1 repetitions, the UE selects the 4 step RA resource configuration for multiple PRACH transmissions with 2 msg1 repetitions.
- Otherwise, UE selects 4 step RA resource configuration without any Msg1 repetitions.

In one embodiment, the UE applies/uses the selected RA resource configuration for the random access procedure and applies Msg1 repetitions if selected RA resource configuration corresponds to Msg1 repetitions.

The embodiments described herein for a random access procedure initiated based on reconfiguration with sync can also be applied for the case where the RRCReconfiguration message includes an LTM cell switch configuration IE for a candidate SpCell and the UE initiates the random access procedure upon receiving a PDCCH or MAC CE indicating the cell switch to the candidate SpCell, and the LTM cell switch configuration IE replaces the Reconfiguration with Sync IE in this case as described herein.

The embodiments described herein for a random access procedure initiated based on reconfiguration with sync can also be applied for the case where an RRCReconfiguration message includes a beam failure reconfiguration IE for the SpCell and the UE initiates the random access procedure upon beam failure detection of the SpCell, and the beam failure reconfiguration IE replaces the Reconfiguration with Sync IE in this case as described herein.

Figure 15:
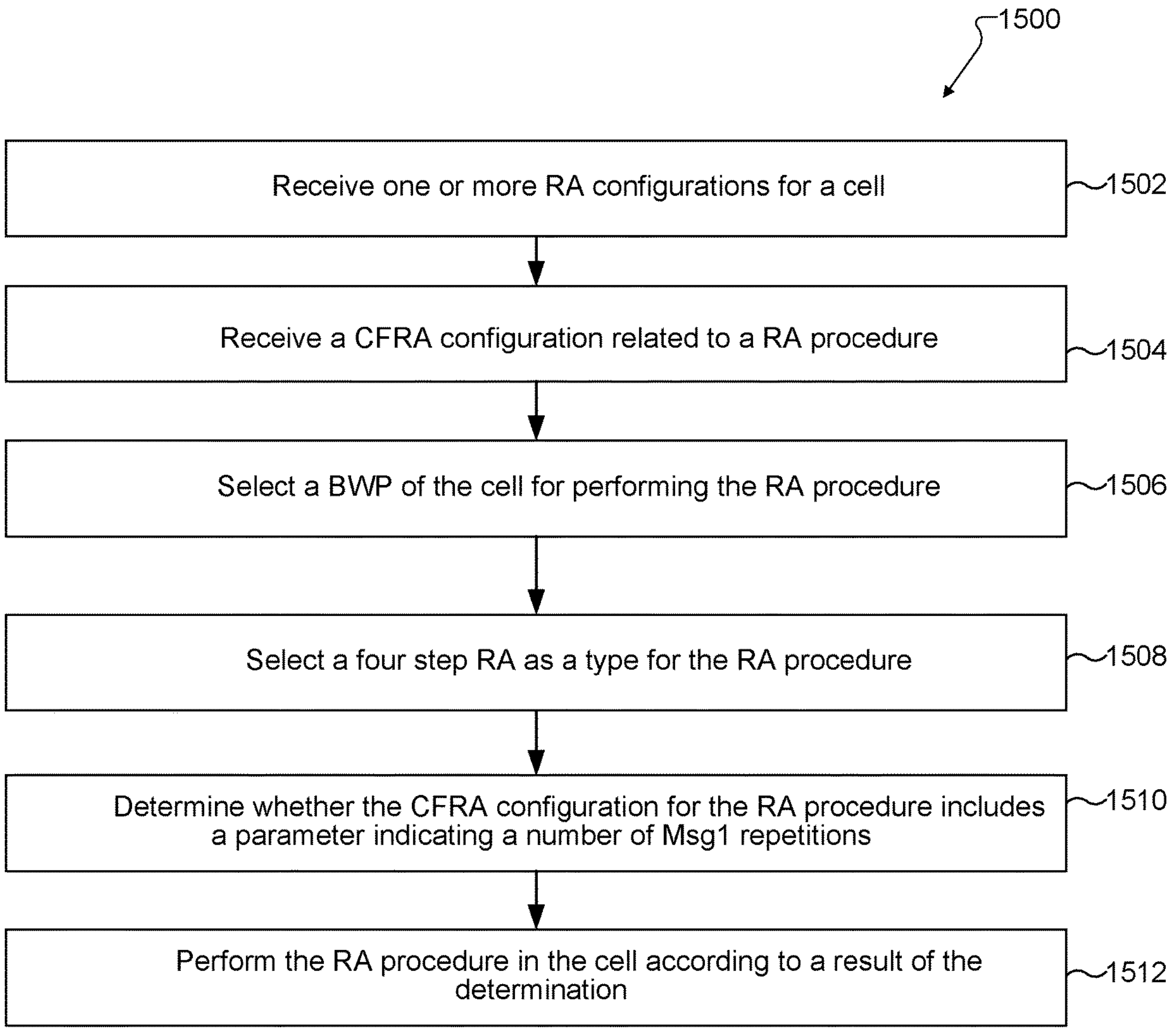
FIG. 15 illustrates a method for PRACH repetition for uplink coverage enhancement according to embodiments of the present disclosure.

FIG. 15 illustrates a method 1500 for PRACH repetition for uplink coverage enhancement according to embodiments of the present disclosure. An embodiment of the method illustrated in FIG. 15 is for illustration only. One or more of the components illustrated in FIG. 15 may be implemented in specialized circuitry configured to perform the noted functions or one or more of the components may be implemented by one or more processors executing instructions to perform the noted functions. Other embodiments for PRACH repetition for uplink coverage enhancement could be used without departing from the scope of this disclosure.

The method 1500 begins at step 1502. At step 1502, a UE such as UE 116 of FIG. 1, receives one or more RA configurations for a cell. In one embodiment, the cell is a SpCell. At step 1504, the UE receives a CFRA configuration related to a RA procedure. In one embodiment, the one or more RA configurations and the CFRA configuration is received in a RRCReconfiguration message. In one embodiment, the RRCReconfiguration message includes a reconfiguration with sync information element (IE). At step 1506, the UE selects a BWP of the cell for performing the RA procedure. At step 1508 the UE selects a four step RA as a type of the RA procedure. At step 1510, the UE determines whether the CFRA configuration for the RA procedure includes a parameter indicating a number of Msg1 repetitions. Finally, at step 1512, the UE performs the RA procedure in the cell according to a result of the determination.

Although FIG. 15 illustrates one example of a method 1500 for PRACH repetition for uplink coverage enhancement, various changes may be made to FIG. 15. For example, while shown as a series of steps, various steps in FIG. 15 could overlap, occur in parallel, occur in a different order, occur any number of times, be omitted, or replaced by other steps.

Any of the above variation embodiments can be utilized independently or in combination with at least one other variation embodiment. The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claim scope. The scope of patented subject matter is defined by the claims.

What is claimed is:

1. An electronic device comprising:
at least one processor including processing circuitry; and
memory storing instructions, wherein the instructions, when executed by the at least one processor individually or collectively, cause the electronic device to:
receive one or more random access (RA) configurations for a cell, and
receive a contention free random access (CFRA) configuration related to a RA procedure;
select a bandwidth part (BWP) of the cell for performing the RA procedure;
select a four step RA as a type for the RA procedure;
determine whether the CFRA configuration for the RA procedure includes a parameter indicating a number of message 1 (Msg1) repetitions; and
perform the RA procedure in the cell according to a result of the determination.

2. The electronic device of claim 1, wherein:
when the CFRA configuration includes the parameter indicating the number of Msg1 repetitions, the instructions, when executed by the at least one processor individually or collectively, further cause the electronic device to select a first RA configuration from the one or more RA configurations corresponding to the selected BWP;
the first RA configuration corresponds to the indicated number of Msg1 repetitions; and
the instructions, when executed by the at least one processor individually or collectively, further cause the electronic device to transmit the indicated number of Msg1 repetitions according to the first RA configuration.

3. The electronic device of claim 1, wherein:
when the CFRA configuration does not include the parameter indicating the number of Msg1 repetitions, the instructions, when executed by the at least one processor individually or collectively, further cause the electronic device to select a second RA configuration from the one or more RA configurations corresponding to the selected BWP;
the second RA configuration is not associated with Msg1 repetitions; and
the instructions, when executed by the at least one processor individually or collectively, further cause the electronic device to transmit a Msg1 without repetitions according to the second RA configuration.

4. The electronic device of claim 1, wherein:
the instructions, when executed by the at least one processor individually or collectively, further cause the electronic device to select an uplink (UL) carrier from one of a supplementary uplink (SUL) or a normal uplink (NUL) carrier of the cell, and
the RA procedure is performed on the selected UL carrier.

5. The electronic device of claim 1, wherein:
the cell is a special cell (SpCell); and
the one or more RA configurations and CFRA configuration for the SpCell is received in a RRCReconfiguration message including a reconfiguration with sync information element (IE).

6. The electronic device of claim 1, wherein the instructions, when executed by the at least one processor individually or collectively, further cause the electronic device to:
select a synchronization signal block (SSB);
select a set of physical random access channel (PRACH) occasions corresponding to the SSB; and
transmit a Msg1 in each PRACH occasion from the selected set during a RA attempt.

7. The electronic device of claim 6, wherein a number of PRACH occasions in the selected set correspond to the number of Msg1 repetitions indicated in the CFRA configuration.

8. A method of operating a base station (BS), the method comprising:
transmitting one or more random access (RA) configurations for a cell,
transmitting a contention free random access (CFRA) configuration related to a RA procedure, the CFRA configuration including a parameter indicating a number of message 1 (Msg1) repetitions; and
performing the RA procedure with a user equipment (UE) in the cell.

9. The method of claim 8, further comprising receiving the indicated number of Msg1 repetitions.

10. The method of claim 8, wherein:
the cell is a special cell (SpCell); and
the one or more RA configurations and CFRA configuration for the SpCell is transmitted in a RRCReconfiguration message including a reconfiguration with sync information element (IE).

11. The method of claim 8, further comprising, during a RA attempt, receiving a Msg1 in each physical random access channel (PRACH) occasion from a set of PRACH occasions selected by the UE, the set of PRACH occasions corresponding to a synchronization signal block (SSB) selected by the UE.

12. The method of claim 11, wherein a number of PRACH occasions in the set of PRACH occasions selected by the UE correspond to the number of Msg1 repetitions indicated in the CFRA configuration.

13. A method of operating a user equipment (UE), the method comprising:
receiving one or more random access (RA) configurations for a cell;
receiving a contention free random access (CFRA) configuration related to a RA procedure;
selecting a bandwidth part (BWP) of the cell for performing the RA procedure;
selecting a four step RA as a type for the RA procedure;
determining whether the CFRA configuration for the RA procedure includes a parameter indicating a number of message 1 (Msg1) repetitions; and
performing the RA procedure in the cell according to a result of the determination.

14. The method of claim 8, wherein the RA procedure is performed on an uplink (UL) carrier selected by the UE from one of a supplementary uplink (SUL) or a normal uplink (NUL) carrier of the cell.

15. The method of claim 13, wherein when the CFRA configuration includes the parameter indicating the number of Msg1 repetitions, the method further comprises:
selecting a first RA configuration from the one or more RA configurations corresponding to the selected BWP; and
transmitting the indicated number of Msg1 repetitions according to the first RA configuration,
wherein the first RA configuration corresponds to the indicated number of Msg1 repetitions.

16. The method of claim 13, wherein when the CFRA configuration does not include the parameter indicating the number of Msg1 repetitions, the method further comprises:

selecting a second RA configuration from the one or more RA configurations corresponding to the selected BWP; and transmitting a Msg1 without repetitions according to the second RA configuration, wherein the second RA configuration is not associated with Msg1 repetitions.

17. The method of claim 13, further comprising:

selecting an uplink (UL) carrier from one of a supplementary uplink (SUL) or a normal uplink (NUL) carrier of the cell, wherein the RA procedure is performed on the selected UL carrier.

18. The method of claim 13, wherein:

the cell is a special cell (SpCell); and the one or more RA configurations and CFRA configuration for the SpCell is received in a RRCReconfiguration message including a reconfiguration with sync information element (IE).

19. The method of claim 13, further comprising:

selecting a synchronization signal block (SSB);

selecting a set of physical random access channel (PRACH) occasions corresponding to the SSB; and transmitting a Msg1 in each PRACH occasion from the selected set during a RA attempt.

20. The method of claim 19, wherein a number of PRACH occasions in the selected set correspond to the number of Msg1 repetitions indicated in the CFRA configuration.

* * * * *